US011173453B2

(12) United States Patent
Cao et al.

(10) Patent No.: US 11,173,453 B2
(45) Date of Patent: Nov. 16, 2021

(54) METHOD AND DEVICE FOR REPAIRING A MEMBRANE FILTRATION MODULE

(71) Applicant: Rohm & Haas Electronic Materials Singapore PTE LTD, Singapore (SG)

(72) Inventors: Zhiyi Cao, Lidcombe (AU); Bruce Gregory Biltoft, Chatswood (AU); Jessica Stiller, Riverstone (AU); Ying Hao Teo, Quakers Hill (AU)

(73) Assignee: ROHM AND HAAS ELECTRONIC MATERIALS SINGAPORES, Singapore (SG)

( * ) Notice: Subject to any disclaimer, the term of this patent is extended or adjusted under 35 U.S.C. 154(b) by 126 days.

(21) Appl. No.: 16/581,709

(22) Filed: Sep. 24, 2019

(65) Prior Publication Data

US 2020/0016546 A1    Jan. 16, 2020

Related U.S. Application Data

(63) Continuation of application No. 15/025,702, filed as application No. PCT/US2014/057326 on Sep. 25, 2014, now Pat. No. 10,427,102.

(30) Foreign Application Priority Data

Oct. 2, 2013    (AU) ................................ 2013903804

(51) Int. Cl.
*B01D 65/10* (2006.01)
*B01D 63/02* (2006.01)
*B01D 63/04* (2006.01)

(52) U.S. Cl.
CPC .......... *B01D 65/108* (2013.01); *B01D 63/02* (2013.01); *B01D 63/04* (2013.01); *B01D 63/043* (2013.01);

(Continued)

(58) Field of Classification Search
None
See application file for complete search history.

(56) References Cited

U.S. PATENT DOCUMENTS

| 256,008 A | 4/1882 | Leak |
| 285,321 A | 9/1883 | Tams |

(Continued)

FOREIGN PATENT DOCUMENTS

| AU | 34400/84 A | 4/1985 |
| AU | 77066/87 A | 2/1988 |

(Continued)

OTHER PUBLICATIONS

Almulla et al., "Developments in high recovery brackish water desalination plants as part of the solution to water quantity problems," Desalination, 153 (2002), pp. 237-243.

(Continued)

*Primary Examiner* — David C Mellon
(74) *Attorney, Agent, or Firm* — Kenneth Grimaldi

(57) ABSTRACT

A method for repairing a membrane filtration module in fluid communication with a plurality of additional membrane filtration modules includes fluidly connecting a fluid transfer assembly to the membrane filtration module, fluidly isolating the membrane filtration module from the plurality of additional membrane filtration modules, forcing liquid within the membrane filtration module into the fluid transfer assembly by introducing a pressurized gas into the membrane filtration module, releasing the pressurized gas from the membrane filtration module, fluidly disconnecting the fluid transfer assembly from the membrane filtration module, repairing one or more damaged membranes in the membrane filtration module, and fluidly reconnecting the membrane filtration module to the plurality of additional membrane filtration modules.

20 Claims, 12 Drawing Sheets

(52) U.S. Cl.
CPC ......... *B01D 63/046* (2013.01); *B01D 65/106*
(2013.01); *B01D 2313/18* (2013.01); *B01D*
*2313/21* (2013.01); *B01D 2313/54* (2013.01)

(56) References Cited

U.S. PATENT DOCUMENTS

| | | | |
|---|---|---|---|
| 403,507 A | 5/1889 | Bode |
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,517,626 A | 8/1950 | Berg |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carrara |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,827,566 A | 8/1974 | Ponce |
| 3,843,809 A | 10/1974 | Luck |
| 3,876,738 A | 4/1975 | Marinaccio et al. |
| 3,912,624 A | 10/1975 | Jennings |
| 3,937,015 A | 2/1976 | Akado et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,016,078 A | 4/1977 | Clark |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,130,622 A | 12/1978 | Pawlak |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |

(56) References Cited

U.S. PATENT DOCUMENTS

| | | |
|---|---|---|
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,812,235 A | 3/1989 | Seleman et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,931,186 A | 6/1990 | Ford et al. |
| 4,933,084 A | 6/1990 | Bandel et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,980,066 A | 12/1990 | Siegers |
| 4,988,444 A | 1/1991 | Applegate et al. |
| 4,990,251 A | 2/1991 | Spranger et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,402 A | 11/1991 | Me et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,145,826 A | 9/1992 | Hirschberg et al. |
| 5,147,553 A | 9/1992 | Waite |
| 5,151,191 A | 9/1992 | Sunaoka et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,728 A | 5/1993 | Trimmer |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,411,663 A | 5/1995 | Johnson |
| 5,415,490 A | 5/1995 | Flory |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,484,528 A | 1/1996 | Vagi et al. |
| 5,490,939 A | 2/1996 | Gerigk et al. |
| 5,501,798 A | 3/1996 | Al-Samadi et al. |
| 5,525,220 A | 6/1996 | Yagi et al. |
| 5,531,900 A | 7/1996 | Raghavan et al. |
| 5,552,047 A | 9/1996 | Oshida et al. |
| 5,556,591 A | 9/1996 | Jallerat et al. |
| 5,597,732 A | 1/1997 | Bryan-Brown |
| 5,607,593 A | 3/1997 | Cote et al. |
| 5,626,755 A | 5/1997 | Keyser et al. |
| 5,633,163 A | 5/1997 | Cameron |
| 5,639,373 A | 6/1997 | Mahendran et al. |
| 5,647,988 A | 7/1997 | Kawanishi et al. |
| 5,651,393 A | 7/1997 | Danowski |
| 5,670,053 A | 9/1997 | Collentro et al. |
| 5,677,360 A | 10/1997 | Yamamor et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Ostrom |
| 5,958,243 A | 9/1999 | Lawrence et al. |

(56) References Cited

U.S. PATENT DOCUMENTS

| | | |
|---|---|---|
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,036,030 A | 3/2000 | Stone et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,381 A | 7/2000 | Connelly et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,149,817 A | 11/2000 | Peterson et al. |
| 6,156,200 A | 12/2000 | Zha et al. |
| 6,162,020 A | 12/2000 | Kondo |
| 6,171,496 B1 | 1/2001 | Patil |
| 6,193,890 B1 | 2/2001 | Pedersen et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,383,369 B2 | 5/2002 | Elston |
| 6,387,189 B1 | 5/2002 | Groschl et al. |
| 6,402,955 B2 | 6/2002 | Ookata |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,733 B1 | 2/2003 | Nonobe |
| 6,550,747 B2 | 4/2003 | Rabie et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,623,643 B2 | 9/2003 | Chisholm et al. |
| 6,627,082 B2 | 9/2003 | Del Vecchio et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Aranguiz |
| 6,743,362 B1 | 6/2004 | Porteous et al. |
| 6,755,894 B2 | 6/2004 | Bikson et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,881,343 B2 | 4/2005 | Rabie et al. |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,138 B2 | 5/2005 | Lundman |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,699 B2 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,255,788 B2 | 8/2007 | Okazaki et al. |
| 7,264,716 B2 | 9/2007 | Johnson et al. |
| 7,279,100 B2 | 10/2007 | Devine |
| 7,279,215 B2 | 10/2007 | Hester et al. |
| 7,314,563 B2 | 1/2008 | Cho et al. |
| 7,329,344 B2 | 2/2008 | Jordan et al. |

(56) References Cited

U.S. PATENT DOCUMENTS

| | | |
|---|---|---|
| 7,344,645 B2 | 3/2008 | Beck et al. |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,931,463 B2 | 4/2011 | Cox et al. |
| 8,002,246 B2 | 8/2011 | Eguchi et al. |
| 8,197,688 B2 | 6/2012 | Sakashita et al. |
| 8,287,923 B2 | 10/2012 | Hsu et al. |
| 8,372,282 B2 | 2/2013 | Zha et al. |
| 8,506,806 B2 | 8/2013 | Beck et al. |
| 8,679,337 B2 | 3/2014 | Ishibashi et al. |
| 9,022,224 B2 | 5/2015 | Collignon et al. |
| 2001/0035092 A1 | 11/2001 | Hachimaki et al. |
| 2001/0052494 A1 | 12/2001 | Cote et al. |
| 2002/0027111 A1 | 3/2002 | Ando et al. |
| 2002/0070157 A1 | 6/2002 | Kamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2003/0038075 A1 | 2/2003 | Akimoto et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0062301 A1 | 4/2003 | Merrie et al. |
| 2003/0075495 A1 | 4/2003 | Dannstrom et al. |
| 2003/0075504 A1 | 4/2003 | Zha et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0159977 A1 | 8/2003 | Tanny et al. |
| 2003/0159988 A1 | 8/2003 | Daigger et al. |
| 2003/0173706 A1 | 9/2003 | Rabie et al. |
| 2003/0196955 A1 | 10/2003 | Hughes |
| 2003/0205519 A1 | 11/2003 | Zha et al. |
| 2003/0226797 A1 | 12/2003 | Phelps |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Vecchio et al. |
| 2004/0108268 A1 | 6/2004 | Liu et al. |
| 2004/0112831 A1 | 6/2004 | Rabie et al. |
| 2004/0118779 A1 | 6/2004 | Rawson et al. |
| 2004/0129637 A1 | 7/2004 | Husain et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0173525 A1 | 9/2004 | Hunniford et al. |
| 2004/0188339 A1 | 9/2004 | Murkute et al. |
| 2004/0188341 A1 | 9/2004 | Zha et al. |
| 2004/0222158 A1 | 11/2004 | Husain et al. |
| 2004/0232076 A1 | 11/2004 | Zha et al. |
| 2004/0245174 A1 | 12/2004 | Takayama et al. |
| 2005/0000885 A1 | 1/2005 | Stockbower |
| 2005/0006308 A1 | 1/2005 | Cote et al. |
| 2005/0023219 A1 | 2/2005 | Kirker et al. |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0161389 A1 | 7/2005 | Takeda et al. |
| 2005/0184008 A1 | 8/2005 | Schacht et al. |
| 2005/0194305 A1 | 9/2005 | Vido et al. |
| 2005/0194310 A1 | 9/2005 | Yamamoto et al. |
| 2005/0194315 A1 | 9/2005 | Adams et al. |
| 2006/0021929 A1 | 2/2006 | Mannheim et al. |
| 2006/0033222 A1 | 2/2006 | Godfrey et al. |
| 2006/0049093 A1 | 3/2006 | Chikura et al. |
| 2006/0065596 A1 | 3/2006 | Kent et al. |
| 2006/0081533 A1 | 4/2006 | Khudenko |
| 2006/0091074 A1 | 5/2006 | Pedersen et al. |
| 2006/0113226 A1 | 6/2006 | Breitner et al. |
| 2006/0145366 A1 | 7/2006 | Thomas |
| 2006/0151373 A1 | 7/2006 | Szabo et al. |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0273007 A1 | 12/2006 | Zha et al. |
| 2006/0273038 A1 | 12/2006 | Syed et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0075017 A1 | 4/2007 | Kuzma |
| 2007/0084791 A1 | 4/2007 | Jordan et al. |
| 2007/0084795 A1 | 4/2007 | Jordan |
| 2007/0095741 A1 | 5/2007 | Berends |
| 2007/0102339 A1 | 5/2007 | Cote et al. |
| 2007/0108125 A1 | 5/2007 | Cho et al. |
| 2007/0138090 A1 | 6/2007 | Jordan et al. |
| 2007/0163942 A1 | 7/2007 | Tanaka et al. |
| 2007/0170112 A1 | 7/2007 | Elefritz et al. |
| 2007/0181496 A1 | 8/2007 | Zuback |
| 2008/0011675 A1 | 1/2008 | Kedziora |
| 2008/0093297 A1 | 4/2008 | Sock et al. |
| 2008/0179249 A1 | 7/2008 | Beck et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0084725 A1 | 4/2009 | Poklop et al. |
| 2009/0194477 A1 | 8/2009 | Hashimoto |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0147298 A1 | 6/2011 | Kennedy et al. |
| 2011/0192783 A1 | 8/2011 | Cox et al. |
| 2012/0074053 A1 | 3/2012 | Collignon et al. |
| 2012/0091602 A1 | 4/2012 | Cumin et al. |
| 2012/0097601 A1 | 4/2012 | Lee et al. |
| 2012/0103904 A1 | 5/2012 | Morita et al. |
| 2012/0285885 A1 | 11/2012 | James et al. |
| 2013/0037467 A1 | 2/2013 | Biltoft et al. |
| 2013/0055792 A1 | 3/2013 | Scheu et al. |
| 2013/0056426 A1 | 3/2013 | Barnes |

(56) References Cited

U.S. PATENT DOCUMENTS

| | | | |
|---|---|---|---|
| 2013/0168307 | A1 | 7/2013 | Drivarbekk et al. |
| 2014/0174998 | A1 | 6/2014 | Aerts et al. |
| 2015/0136686 | A1 | 5/2015 | Chen |

FOREIGN PATENT DOCUMENTS

| | | | |
|---|---|---|---|
| AU | 762091 B2 | 6/2003 | |
| CA | 2531764 A1 | 3/2005 | |
| CN | 2204898 Y | 8/1995 | |
| CN | 2236049 Y | 9/1996 | |
| CN | 1541757 A | 11/2004 | |
| DE | 3904544 A1 | 8/1990 | |
| DE | 4117281 A1 | 1/1992 | |
| DE | 4113420 A1 | 10/1992 | |
| DE | 4117422 C1 | 11/1992 | |
| DE | 4326603 A1 | 2/1995 | |
| DE | 19503060 A1 | 8/1996 | |
| DE | 19718028 C1 | 6/1998 | |
| DE | 29804927 U1 | 6/1998 | |
| DE | 29906389 U1 | 6/1999 | |
| DE | 10045227 C1 | 2/2002 | |
| DE | 10209170 C1 | 8/2003 | |
| DE | 202004012693 U1 | 10/2004 | |
| EP | 0012557 A1 | 6/1980 | |
| EP | 0053833 A2 | 6/1982 | |
| EP | 0090383 A2 | 10/1983 | |
| EP | 0038612 B1 | 12/1983 | |
| EP | 126714 A2 | 11/1984 | |
| EP | 194735 A2 | 9/1986 | |
| EP | 250337 A1 | 12/1987 | |
| EP | 280052 A1 | 8/1988 | |
| EP | 327025 A1 | 8/1989 | |
| EP | 344633 A1 | 12/1989 | |
| EP | 407900 A2 | 1/1991 | |
| EP | 0464321 A1 | 1/1992 | |
| EP | 492942 A2 | 7/1992 | |
| EP | 547575 A1 | 6/1993 | |
| EP | 627255 A1 | 12/1994 | |
| EP | 662341 A1 | 7/1995 | |
| EP | 492446 B1 | 11/1995 | |
| EP | 430082 B1 | 6/1996 | |
| EP | 518250 B1 | 9/1996 | |
| EP | 734758 A1 | 10/1996 | |
| EP | 763758 A1 | 3/1997 | |
| EP | 824956 A2 | 2/1998 | |
| EP | 848194 A2 | 6/1998 | |
| EP | 911073 A1 | 4/1999 | |
| EP | 920904 A2 | 6/1999 | |
| EP | 0937494 A2 | 8/1999 | |
| EP | 1034835 A1 | 9/2000 | |
| EP | 1156015 A1 | 11/2001 | |
| EP | 1236503 A1 | 9/2002 | |
| EP | 1466658 A1 | 10/2004 | |
| FR | 2620712 A1 | 3/1989 | |
| FR | 2674448 A1 | 10/1992 | |
| FR | 2699424 A1 | 6/1994 | |
| FR | 2762834 A1 | 11/1998 | |
| GB | 702911 A | 1/1954 | |
| GB | 996195 A | 6/1965 | |
| GB | 2253572 A | 9/1992 | |
| JP | 52-078677 A | 7/1977 | |
| JP | 53-5077 | 1/1978 | |
| JP | 53108882 A | 9/1978 | |
| JP | 54162684 A | 12/1979 | |
| JP | 55099703 A | 7/1980 | |
| JP | 55129107 A | 10/1980 | |
| JP | 55129155 A | 10/1980 | |
| JP | 56021604 A | 2/1981 | |
| JP | 56118701 A | 9/1981 | |
| JP | 56121685 A | 9/1981 | |
| JP | 57190697 A | 11/1982 | |
| JP | 58088007 A | 5/1983 | |
| JP | 60019002 A | 1/1985 | |
| JP | 60206412 A | 10/1985 | |
| JP | 60260628 A | 12/1985 | |
| JP | 61097005 A | 5/1986 | |
| JP | 61097006 A | 5/1986 | |
| JP | 61107905 A | 5/1986 | |
| JP | 61167406 A | 7/1986 | |
| JP | 61167407 A | 7/1986 | |
| JP | 61171504 A | 8/1986 | |
| JP | 61192309 A | 8/1986 | |
| JP | 61222510 A | 10/1986 | |
| JP | 61242607 A | 10/1986 | |
| JP | 61249505 A | 11/1986 | |
| JP | 61257203 A | 11/1986 | |
| JP | 61263605 A | 11/1986 | |
| JP | 61291007 A | 12/1986 | |
| JP | 61293504 A | 12/1986 | |
| JP | 62004408 A | 1/1987 | |
| JP | 62068828 A | 3/1987 | |
| JP | 62114609 A | 5/1987 | |
| JP | 62140607 A | 6/1987 | |
| JP | 62144708 A | 6/1987 | |
| JP | 62163708 A | 7/1987 | |
| JP | 62179540 A | 8/1987 | |
| JP | 62237908 A | 10/1987 | |
| JP | 62250908 A | 10/1987 | |
| JP | 62187606 | 11/1987 | |
| JP | 62262710 A | 11/1987 | |
| JP | 63-93307 | 4/1988 | |
| JP | 63097634 A | 4/1988 | |
| JP | 63099246 A | 4/1988 | |
| JP | 63143905 A | 6/1988 | |
| JP | 63-1602 | 7/1988 | |
| JP | 63171607 A | 7/1988 | |
| JP | 63180254 A | 7/1988 | |
| JP | S63-38884 | 10/1988 | |
| JP | 64-075542 A | 3/1989 | |
| JP | 1-501046 T | 4/1989 | |
| JP | 1111494 A | 4/1989 | |
| JP | 01151906 A | 6/1989 | |
| JP | 01-307409 A | 12/1989 | |
| JP | 02-017925 | 1/1990 | |
| JP | 02017924 | 1/1990 | |
| JP | 02026625 A | 1/1990 | |
| JP | 02031200 A | 2/1990 | |
| JP | 02040296 A | 2/1990 | |
| JP | 02107318 A | 4/1990 | |
| JP | 02126922 A | 5/1990 | |
| JP | 02144132 A | 6/1990 | |
| JP | 02164423 A | 6/1990 | |
| JP | 02174918 A | 7/1990 | |
| JP | 02241523 A | 9/1990 | |
| JP | 02277528 A | 11/1990 | |
| JP | 02284035 A | 11/1990 | |
| JP | 03018373 A | 1/1991 | |
| JP | 03028797 A | 2/1991 | |
| JP | 03-086529 A | 4/1991 | |
| JP | 03110445 A | 5/1991 | |
| JP | 04108518 A | 4/1992 | |
| JP | 04110023 A | 4/1992 | |
| JP | 4-190889 A | 7/1992 | |
| JP | 04187224 A | 7/1992 | |
| JP | 4-256425 A | 9/1992 | |
| JP | 04250898 A | 9/1992 | |
| JP | 04256424 A | 9/1992 | |
| JP | 04265128 A | 9/1992 | |
| JP | 04293527 A | 10/1992 | |
| JP | 04310223 A | 11/1992 | |
| JP | 04317793 A | 11/1992 | |
| JP | 04334530 A | 11/1992 | |
| JP | 04348252 A | 12/1992 | |
| JP | 05-4030 | 1/1993 | |
| JP | 05023557 A | 2/1993 | |
| JP | 05096136 A | 4/1993 | |
| JP | 05137977 A | 6/1993 | |
| JP | 05157654 A | 6/1993 | |
| JP | 05161831 A | 6/1993 | |
| JP | 05184884 A | 7/1993 | |
| JP | 05285348 A | 11/1993 | |
| JP | 05305221 A | 11/1993 | |
| JP | 06-027215 A | 2/1994 | |
| JP | 06071120 A | 3/1994 | |

(56) References Cited

FOREIGN PATENT DOCUMENTS

| | | |
|---|---|---|
| JP | 06114240 A | 4/1994 |
| JP | 06170364 A | 6/1994 |
| JP | 06190250 A | 7/1994 |
| JP | 06218237 A | 8/1994 |
| JP | 06238273 A | 8/1994 |
| JP | 06-292820 | 10/1994 |
| JP | 06277469 A | 10/1994 |
| JP | 06285496 A | 10/1994 |
| JP | 06343837 A | 12/1994 |
| JP | 07000770 A | 1/1995 |
| JP | 07024272 A | 1/1995 |
| JP | 07068139 A | 3/1995 |
| JP | 07136470 A | 5/1995 |
| JP | 07136471 A | 5/1995 |
| JP | 07155564 A | 6/1995 |
| JP | 07155758 A | 6/1995 |
| JP | 7-39921 | 7/1995 |
| JP | 07178323 A | 7/1995 |
| JP | 07185268 A | 7/1995 |
| JP | 07185270 A | 7/1995 |
| JP | 07185271 A | 7/1995 |
| JP | 07185272 A | 7/1995 |
| JP | 07204635 A | 8/1995 |
| JP | 07236819 A | 9/1995 |
| JP | 07251043 A | 10/1995 |
| JP | 07256253 | 10/1995 |
| JP | 07275665 A | 10/1995 |
| JP | 07289860 A | 11/1995 |
| JP | 07303895 A | 11/1995 |
| JP | 07313973 A | 12/1995 |
| JP | 08010585 A | 1/1996 |
| JP | 8039089 A | 2/1996 |
| JP | 08197053 A | 8/1996 |
| JP | 08323161 A | 12/1996 |
| JP | 08332357 A | 12/1996 |
| JP | 09000890 A | 1/1997 |
| JP | 09038470 A | 2/1997 |
| JP | 09038648 A | 2/1997 |
| JP | 09072993 A | 3/1997 |
| JP | 09075689 A | 3/1997 |
| JP | 09099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09141063 A | 6/1997 |
| JP | 09155345 A | 6/1997 |
| JP | 09187628 A | 7/1997 |
| JP | 09192458 A | 7/1997 |
| JP | 09220569 A | 8/1997 |
| JP | 09271641 A | 10/1997 |
| JP | 09313902 A | 12/1997 |
| JP | 09324067 A | 12/1997 |
| JP | 10015365 A | 1/1998 |
| JP | 10024222 A | 1/1998 |
| JP | 10033955 A | 2/1998 |
| JP | 10048466 A | 2/1998 |
| JP | 10066972 A | 3/1998 |
| JP | 10076144 A | 3/1998 |
| JP | 10076264 A | 3/1998 |
| JP | 10085562 A | 4/1998 |
| JP | 10085565 A | 4/1998 |
| JP | 10085566 A | 4/1998 |
| JP | 10156149 A | 6/1998 |
| JP | 10180048 A | 7/1998 |
| JP | 10225685 A | 8/1998 |
| JP | 10235168 A | 9/1998 |
| JP | 10249171 A | 9/1998 |
| JP | 10286441 A | 10/1998 |
| JP | 10328538 A | 12/1998 |
| JP | 11005023 A | 1/1999 |
| JP | 11028339 A | 2/1999 |
| JP | 11028467 A | 2/1999 |
| JP | 11031025 A | 2/1999 |
| JP | 11033365 A | 2/1999 |
| JP | 11033367 A | 2/1999 |
| JP | 11076769 A | 3/1999 |
| JP | 11076770 A | 3/1999 |
| JP | 11090189 A | 4/1999 |
| JP | 11156166 A | 6/1999 |
| JP | 11156360 A | 6/1999 |
| JP | 11165200 A | 6/1999 |
| JP | 11179171 A | 7/1999 |
| JP | 11300177 A | 11/1999 |
| JP | 11302438 A | 11/1999 |
| JP | 11309351 A | 11/1999 |
| JP | 11319501 A | 11/1999 |
| JP | 11319507 A | 11/1999 |
| JP | 11333265 A | 12/1999 |
| JP | 2000000439 A | 1/2000 |
| JP | 200051670 | 2/2000 |
| JP | 2000051669 A | 2/2000 |
| JP | 2000061466 A | 2/2000 |
| JP | 200079390 A | 3/2000 |
| JP | 2000070684 A | 3/2000 |
| JP | 2000093758 | 4/2000 |
| JP | 2000157845 | 6/2000 |
| JP | 2000157850 A | 6/2000 |
| JP | 2000185220 A | 7/2000 |
| JP | 2000189958 A | 7/2000 |
| JP | 2000233020 A | 8/2000 |
| JP | 2000237548 A | 9/2000 |
| JP | 2000300968 A | 10/2000 |
| JP | 2000317276 A | 11/2000 |
| JP | 2000334276 A | 12/2000 |
| JP | 2000342932 A | 12/2000 |
| JP | 2001009246 A | 1/2001 |
| JP | 2001070967 A | 3/2001 |
| JP | 2001079366 A | 3/2001 |
| JP | 2001079367 A | 3/2001 |
| JP | 2001104760 A | 4/2001 |
| JP | 2001120963 A | 5/2001 |
| JP | 2001179059 A | 7/2001 |
| JP | 2001179060 A | 7/2001 |
| JP | 2001190937 A | 7/2001 |
| JP | 2001190938 A | 7/2001 |
| JP | 2001205055 A | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002177746 A | 6/2002 |
| JP | 2002263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004008981 | 1/2004 |
| JP | 2004050011 A | 2/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004337730 A | 12/2004 |
| JP | 2005-087887 | 4/2005 |
| JP | 2005144291 A | 6/2005 |
| JP | 2005154551 A | 6/2005 |
| JP | 2005279447 A | 10/2005 |
| JP | 2006116495 | 5/2006 |
| KR | 1998-0024438 | 7/1998 |
| KR | 20-0232145 | 7/2001 |

(56) References Cited

FOREIGN PATENT DOCUMENTS

| | | |
|---|---|---|
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| TW | 216773 B | 12/1993 |
| TW | 347343 | 12/1998 |
| WO | 1985001449 A1 | 4/1985 |
| WO | 1986005116 A1 | 9/1986 |
| WO | 1986005705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 1993002779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 199629142 A1 | 9/1996 |
| WO | 9641676 A1 | 12/1996 |
| WO | 9706880 A2 | 2/1997 |
| WO | 9710046 A1 | 3/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9906326 A1 | 2/1999 |
| WO | 199908773 A1 | 2/1999 |
| WO | 99-55448 A1 | 11/1999 |
| WO | 9959707 A1 | 11/1999 |
| WO | 0021890 A1 | 4/2000 |
| WO | 200018498 A1 | 4/2000 |
| WO | 200030742 A1 | 6/2000 |
| WO | 200100307 A2 | 1/2001 |
| WO | 200105715 A1 | 1/2001 |
| WO | 0108790 A1 | 2/2001 |
| WO | 0116030 A1 | 3/2001 |
| WO | 200119414 A1 | 3/2001 |
| WO | 200132299 A1 | 5/2001 |
| WO | 200136075 A1 | 5/2001 |
| WO | 0143856 A1 | 6/2001 |
| WO | 200145829 A1 | 6/2001 |
| WO | 2002004100 | 1/2002 |
| WO | 0211867 A1 | 2/2002 |
| WO | 0230550 A1 | 4/2002 |
| WO | 200226363 A2 | 4/2002 |
| WO | 2002040140 A1 | 5/2002 |
| WO | 2002047800 A1 | 6/2002 |
| WO | 2003000389 A2 | 1/2003 |
| WO | 03013706 A1 | 2/2003 |
| WO | 2003024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 2003095078 A1 | 11/2003 |
| WO | 04024304 A2 | 3/2004 |
| WO | 2004018084 A1 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005023997 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |
| WO | 2012/033084 A1 | 3/2012 |
| WO | 2013048801 A1 | 4/2013 |
| WO | 2013049109 A1 | 4/2013 |

OTHER PUBLICATIONS

Anonymous, "Nonwoven Constructions of Dyneon™ THV and Dyneon™ HTE Fluorothermoplastics", Research Disclosure Journal, Apr. 1999, RD 420013, 2 pages.

Berg et al., "Flux Decline in Ultrafiltration Processes," Desalination, 77 (1990) pp. 101-133.

Brazilian Office Action dated Nov. 29, 2010 from Application No. PI0316992-8 (with translation).

Cote et al. "A New Immersed Membrane for Pretreatment to Reverse Osmosis," Desalination, 139 (2001), pp. 229-236.

Cote et al., "Immersed Membranes Activated Sludge Process Applied to the Treatment of Municipal Wastewater," Wat. Sci. Tech. 38(4-5) (1998), pp. 437-442.

Coulson et al., "Coulson and Richardson's Chemical Engineering," 1999, vol. 1, pp. 358-364.

Crawford et al., American Water Works Association Membrane Technology Conference, "Procurement of Membrane Equipment: Differences Between Water Treatment and Membrane Bioreactor (MBR) Applications," (2003).

Cui et al., "Airlift crossflow membrane filtration—a feasibility study with dextran ultrafiltration," J. Membrane Sci. (1997) vol. 128, pp. 83-91.

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent et al., "Neural networks for long term prediction of fouling and backwash efficiency in ultrafiltration for drinking water production," Desalination 131 (2000) pp. 353-362.

Dow Chemical Company, "Filmtec Membranes—Cleaning Procedures for Filmtec FT30 Elements," Tech Facts, Online, Jun. 30, 2000, XP002237568.

EPA, Membrane Filtration Guidance Manual, Nov. 2005.

Husain, H et al., "The ZENON experience with membrane bioreactors for municipal wastewater treatment," MBR2 Membr. Bioreact. Wastewater Treat., 2nd Intl. Meeting; School of Water Sciences, Cranfield University, Cranfield, UK, Jun. 1999.

(56) References Cited

OTHER PUBLICATIONS

Johnson, "Recent Advances in Microfiltration for Drinking Water Treatment," AWWA Annual Conference, Jun. 20-24, 1999, Chicago, Illinois, entire publication.

Jones, Craig, "Applications of Hydrogen Peroxide and Derivatives," The Royal Society of Chemistry, Cambridge, UK 1999, Chapters 2 and 5.

Judd, "The MBR Book: Principles and Applications of Membrane Bioreactors in Water and Wastewater Treatment," (2006), pp. 174-178.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system," Water Research, 37(5) Mar. 2003, pp. 1192-1197, Elsevier, Amsterdam, NL.

Korean Notice of Last Preliminary Rejection dated Apr. 16, 2010 for Application No. 10-2005-7010079 (with translation).

Lloyd, D.R. et al. "Microporous Membrane Formation Via Thermally Induced Phase Separation/Solid-Liquid Phase Separation," Journal of Membrane Science, 52(3) (1990), pp. 239-261, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic," Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Miller et al., "Side Stream Air Lift MBR Development and Successful Application of a New Generation of MBR," Pollution Solutions Brochure, NORIT, The Netherlands, Apr. 2008.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., "Filterability of activated sludge in membrane bioreactors," Desalination, 151 (2002), pp. 195-200.

Schematic of 4" Geyser Pump, Geyser Pump Tech. Co., Nov. 13, 2005.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwmmrw.interscience.wiley.com/eow/.

White et al., "Optimisation of intermittently operated microfiltration processes," The Chemical Engineering Journal, 52 (1993), pp. 73-77.

Wikipedia, "Seawater," available at http://en.wikipedia.org/wiki/Seawater, Jul. 15, 2007.

Yamamoto et al., "Direct Solid-Liquid Separation Using Hollow Fiber Membrane in an Activated Sludge Aeration Tank," Water Science Technology, 21 (1989), pp. 43-54.

Yoon: "Important operational parameters of membrane bioreactor-sludge disintegration (MBR-SD) system for zero excess sludge production" Water Research, 37 (2003), pp. 1921-1931, Elsevier, Amsterdam, NL.

Zenon, "Proposal for ZeeWeed® Membrane Filtration Equipment System for the City of Westminster, Colorado, Proposal No. 479-99," Mar. 2000, entire publication.

Lu, et al., "The Influence of Bubble Characteristic on the Performance of Submerged Hollow Fiber Membrane Module Used in Microfiltration," Separation and Technology, 61 (2008), pp. 89-95.

METHOD AND DEVICE FOR REPAIRING A MEMBRANE FILTRATION MODULE

RELATED APPLICATIONS

This application is a continuation of U.S. application Ser. No. 15/025,702 titled METHOD AND DEVICE FOR REPAIRING A MEMBRANE FILTRATION MODULE filed Mar. 29, 2016, now U.S. Pat. No. 10,427,102, issued Oct. 1, 2019, which is a National Stage Entry under 37 U.S.C. § 371(c) of PCT/US14/57326, titled A METHOD AND DEVICE FOR REPAIRING A MEMBRANE FILTRATION MODULE filed Sep. 25, 2014, which claims foreign priority benefits under 35 U.S.C. § 119(a)-(d) or 35 U.S.C. § 365(b) of Australian Provisional Application No. 2013903804, titled A METHOD AND DEVICE FOR REPAIRING A MEMBRANE FILTRATION MODULE filed Oct. 2, 2013, each of which are hereby incorporated by reference in its entirety for all purposes.

BACKGROUND

1. Field of Invention

Aspects and embodiments of the present invention relate to membrane filtration systems and, more particularly, to a method and a fluid transfer assembly for such systems that is used to repair the membranes within a module in situ while the module is connected to a manifold fluidly connecting the module to a plurality of additional modules.

2. Discussion of Related Art

Examples of hollow fiber filtration modules and banks of such modules are shown in, for example, International Patent Application PCT/AU87/00309 and PCT/AU90/00470. These applications are incorporated herein by reference in their entireties for all purposes.

In some examples, a hollow fiber filtration module may comprise an elongate tubular casing enclosing a bundle of hollow fiber membranes. At one end of the casing there is a first header which has a feed passageway therethrough. The feed passage is in fluid communication with the interior of the casing and hence the exterior of the fiber membranes. At the other end of the casing there is a second header which has a treated feed passageway therethrough in communication with the interior of the casing and the lumens of the fiber membranes.

At least one of the headers, for example, the lower header, may also be provided with a gas conveying passageway in fluid communication with the interior of the casing and the exterior of the fiber membranes.

The passageways may be formed in off-set portions of the headers. The headers may have planar end faces. A plurality of such modules may be joined together with or without interconnecting manifolds or pipe work to form a row of filter modules. A number of such rows of filter modules may be inter-connected to define a bank of filter modules.

Prior art arrangements typically have manifolds for communicating fluids to and from the headers arranged above and below the headers. The filter cartridges in these systems have a finite life and need to be removed for cleaning or replacement at regular intervals during the operating life of a system. This can be time and labor intensive, resulting in the system being off-line for longer than required, particularly where only one cartridge, located deep within a bank of modules, is required to be replaced or serviced.

SUMMARY

According to a first aspect there is provided a method for diagnosing a membrane filtration module in fluid communication with a plurality of additional membrane filtration modules in situ. In the method, a fluid transfer assembly is fluidly connected to the membrane filtration module. The membrane filtration module is fluidly isolated from the plurality of additional membrane filtration modules. A pressurized gas is introduced into the membrane filtration module to force liquid within the membrane filtration module into the fluid transfer assembly. The pressurized gas is released from the membrane filtration module. The fluid transfer assembly is fluidly disconnected from the membrane filtration module. The module is inspected to determine if one or more membranes in the membrane filtration module are damaged. The membrane filtration module is fluidly reconnected to the plurality of additional membrane filtration modules.

The method provides for filtration membranes in the membrane filtration module to be inspected and for damaged membranes in the membrane filtration module to be blocked while the additional filtration modules, which may be in a same bank of modules as the filtration module undergoing inspection and/or repair, remain operational or in operation. The membrane filtration module may be inspected and/or repaired in situ in the bank of membrane modules without the need to drain feed from the other membrane filtration modules in the bank.

In some embodiments, fluidly isolating the membrane filtration module comprises fluidly isolating a filtrate port of the membrane filtration module. Fluidly isolating the membrane filtration module may comprise fluidly sealing the filtrate port from the plurality of additional membrane filtration modules. In some embodiments, fluidly isolating the membrane filtration module comprises closing the filtrate port.

In some embodiments, fluidly isolating the membrane filtration module comprises fluidly isolating the filtrate port with the fluid transfer assembly. The fluid transfer assembly may comprise a body sealingly engageable with the membrane filtration module, and fluidly isolating the filtrate port may comprise at least partly inserting the body into the membrane filtration module to fluidly seal the filtrate port. In some embodiments, the body closes or blocks the filtrate port.

In some embodiments, fluidly isolating the membrane filtration module comprises fluidly isolating one or more fluid communication openings between the membrane filtration module and the plurality of additional membrane filtration modules. In some embodiments, fluidly isolating the membrane filtration module comprises fluidly sealing the one or more fluid communication openings from the plurality of additional membrane filtration modules. In some embodiments, fluidly isolating the membrane filtration module comprises closing the one or more fluid communication openings.

In some embodiments, fluidly reconnecting the membrane filtration module step comprises fluidly reconnecting the filtrate port. In some embodiments, fluidly reconnecting the membrane filtration module comprises fluidly unsealing the filtrate port. In some embodiments, fluidly reconnecting the membrane filtration module comprises opening the filtrate port.

In some embodiments, fluidly reconnecting the membrane filtration module comprises fluidly reconnecting the one or more fluid communication openings. In some embodiments, fluidly reconnecting the membrane filtration module comprises fluidly unsealing the one or more fluid communication openings. In some embodiments, fluidly reconnecting the membrane filtration module comprises opening the one or more fluid communication openings.

In some embodiments, the fluid communication openings comprise a feed port for introducing a feed liquid into the membrane filtration module, an exhaust port for removing waste liquid and/or enabling backwashing and an aeration port for introducing air into the membrane filtration module for filtration of the feed liquid.

In some embodiments, introducing the pressurized gas comprises directing the pressurized gas into the membrane filtration module. In some embodiments, introducing the pressurized gas comprises injecting the pressurized gas into the membrane filtration module.

In some embodiments, introducing the pressurized gas comprises introducing the pressurized gas through one of the fluid communication openings. Alternatively, a pressurized gas port is provided in a housing of the membrane filtration module for introducing the pressurized gas. In some embodiments, the pressurized gas port is provided in an upper part of the housing of the membrane filtration module.

In some embodiments, the pressurized gas is introduced through the exhaust port and the feed port and aeration port are fluidly isolated. In some embodiments, the feed and aeration ports are fluidly sealed.

In some embodiments, the pressurized gas is introduced downstream of the feed port, with the feed port and the aeration port being fluidly isolated. In some embodiments, the feed port and the aeration port are fluidly sealed.

In some embodiments, the pressurized gas is introduced through the aeration port and the feed port is fluidly isolated. In some embodiments, the feed port is fluidly sealed.

In some embodiments, the pressurized gas is introduced through the pressurized gas port and the exhaust port is fluidly isolated. In some embodiments, the exhaust port is fluidly sealed.

In some embodiments where a separate pressurized gas port is used to introduce the pressurized gas into the membrane filtration module, the exhaust port is fluidly isolated. In some embodiments, the exhaust port is fluidly sealed.

Fluidly isolating the fluid communication openings, and even the filtrate port, can be performed by any isolation means, such as valves. Isolation valves of the type described in International Patent Application PCT/US2012/057198, which is herein incorporated by reference in its entirety for all purposes, are suitable for fluidly isolating the fluid communication openings and/or filtrate port.

In some embodiments, the pressurized gas is at a pressure below the bubble point of membranes in the membrane module. In some embodiments, the pressurized gas is compressed air.

In some embodiments, repairing the one or more damaged membranes comprises directing a pressurized gas into the membranes of the membrane filtration module to identify the one or more damaged membranes. In some embodiments, repairing the one or more damaged membranes comprises inserting a plug into the lumen of each damaged membrane to block the lumens of the damaged membranes.

In some embodiments, the membrane filtration module comprises a membrane sub-module surrounded by a casing and fluidly connected to a header. The header may comprise an open-ended housing for receiving at least one end of the membrane sub-module and a removable end cap. In some embodiments, the open-ended housing and the at least one end of the membrane sub-module defines a filtrate collection chamber.

In some embodiments, the method further comprises removing the end cap sealingly engageable with the header.

According to a second aspect, there is provided a fluid transfer assembly for repairing a membrane filtration module in fluid communication with a plurality of additional membrane filtration modules. The fluid transfer assembly comprises a body having a fluid communication passageway for transferring fluid from the membrane filtration module, wherein the body at least partly fluidly isolates a filtrate port of the membrane filtration module from the fluid communication passageway.

In some embodiments, the body is sealingly engageable with the membrane filtration module. In some embodiments, the body is sealingly engageable with an open-ended housing of the membrane filtration module. In some embodiments, the body partly fluidly seals the filtrate port from the fluid communication passageway. In some embodiments, the body closes or blocks the filtrate port from the fluid communication passageway.

In some embodiments, the body is at least partly insertable into the membrane filtration module. In some embodiments, the body is at least partly insertable into the open-ended housing.

In some embodiments, the fluid transfer assembly comprises a sealing member for fluidly isolating the filtrate port from the fluid communication passageway. In some embodiments, the fluid transfer assembly comprises two sealing members for fluidly sealing the filtrate port from the fluid communication passageway. In some embodiments, the two sealing members are arranged on an outer side of the body such that the sealing members are located on either side of the filtrate port when the body sealingly engages the membrane filtration module. In some embodiments, the sealing members are fittingly engaged with the outer side of the body. In some embodiments, the sealing members each comprise an O-ring.

In some embodiments, the body has a cross-section complementary to the inner cross-section of the membrane filtration module. In some embodiments, the body has a cross-section complementary to the inner cross-section of the open-ended housing of the membrane filtration module. In some embodiments, the body is tubular or cylindrical in shape. In other embodiments, the body is a sleeve.

In some embodiments, the fluid communication passageway extends along the length of the body of the fluid transfer assembly. In some embodiments, the fluid communication passageway extends through a bore of the body.

In some embodiments, the fluid transfer assembly comprises a cap sealingly engageable with the body for inhibiting escape of fluid from a filtrate collection chamber of the membrane filtration module. In some embodiments, the cap fluidly seals the filtrate collection chamber. In some embodiment, the cap comprises a sealing member. In some embodiments, the sealing member comprises an O-ring.

In some embodiments, the fluid transfer assembly comprises a first conduit for transferring liquid from the fluid communication passageway. In some embodiments, the first conduit is connected to a bore in the cap. In some embodiments, the first conduit comprises a fluid transferring tube, pipe, or hose. In some embodiments, the cap comprises a vent hole for facilitating operation of the first conduit.

In some embodiments, the cap comprises a fitting for receiving a second conduit for removing the liquid from the fluid transfer assembly. In some embodiments, the fitting comprises a bore. In some embodiments, the fitting comprises a threaded bore. In some embodiments, the second conduit is a hose, tube, or pipe.

In some embodiments, the cap comprises a first securing member for securing the cap to the body. In some embodiments, the first securing member comprises a flange for engaging a complementary seat in the body. In some embodiments, the flange comprises a bayonet-type fitting.

Alternatively or additionally, the fluid transfer assembly comprises a second securing member for securing the cap to the body. In some embodiments, the second securing member engages the body adjacent the cap to hinder movement of the cap outwardly of the membrane filtration module. In some embodiments, the second securing member comprises a circlip engageable with a seat in the body.

In some embodiments, the cap comprises a thread for engaging a complementary thread on the body.

In some embodiments, the body comprises an engagement member for engaging the membrane filtration module. In some embodiments, the engagement member is a thread formed on the body.

In some embodiments, the cap comprises one or more handles for facilitating installation and removal of the fluid transfer assembly.

According to a third aspect, there is provided a method for regulating the flow of a feed fluid in a membrane filtration module. In the method, a valve is provided adjacent a feed opening of the membrane filtration module. The valve is moveable between a closed position and an open position to regulate or control the flow of the feed fluid into the membrane filtration module.

In some embodiments, the valve is adjustably moveable into a plurality of discrete positions between the closed and open positions.

According to a fourth aspect, there is provided a membrane filtration module comprising a feed opening for receiving a feed fluid and a valve seat downstream of the feed opening. A valve has a valve body that is engageable with the valve seat and a stem for moving the valve body between a closed position and an open position to control the flow of feed fluid into the membrane filtration module.

In some embodiments, the stem is adjustably movable to position the valve body into a plurality of discrete positions between the closed and open positions. In some embodiments, the valve body restricts the flow of feed fluid in the discrete positions. In some embodiments, the valve body gradually restricts the flow of feed fluid in the discrete positions from the open position to the closed position.

In some embodiments, in the closed position, the valve body fluidly isolates the feed opening from an interior of the module. In some embodiments, the valve body fluidly isolates the feed opening from a membrane sub-module.

In some embodiments, the membrane filtration module comprises a valve bore for receiving the stem. In some embodiments, the stem is rotatable within the valve bore to move the valve body between the closed and open positions.

In some embodiments, the valve bore and stem have mutual engagement members. In some embodiments, the valve bore and stem have mutual mating threads.

In some embodiments, the stem is lockable in position so that the valve body is held in one of the discrete positions. In some embodiments, a locking member is provided on the stem. In other embodiments, the stem comprises a stop for limiting movement of the valve body.

In some embodiments, the valve body comprises a sealing member for sealing the valve body against the valve seat. In some embodiments, the sealing member is an O-ring.

In some embodiments, the membrane filtration module comprises an aeration opening for receiving gas or air, wherein the valve seat is located downstream of the aeration opening. In some embodiments, in the closed position, the valve body fluidly isolates the aeration opening from an interior of the module. In some embodiments, the valve body fluidly isolates the aeration opening from a membrane sub-module.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
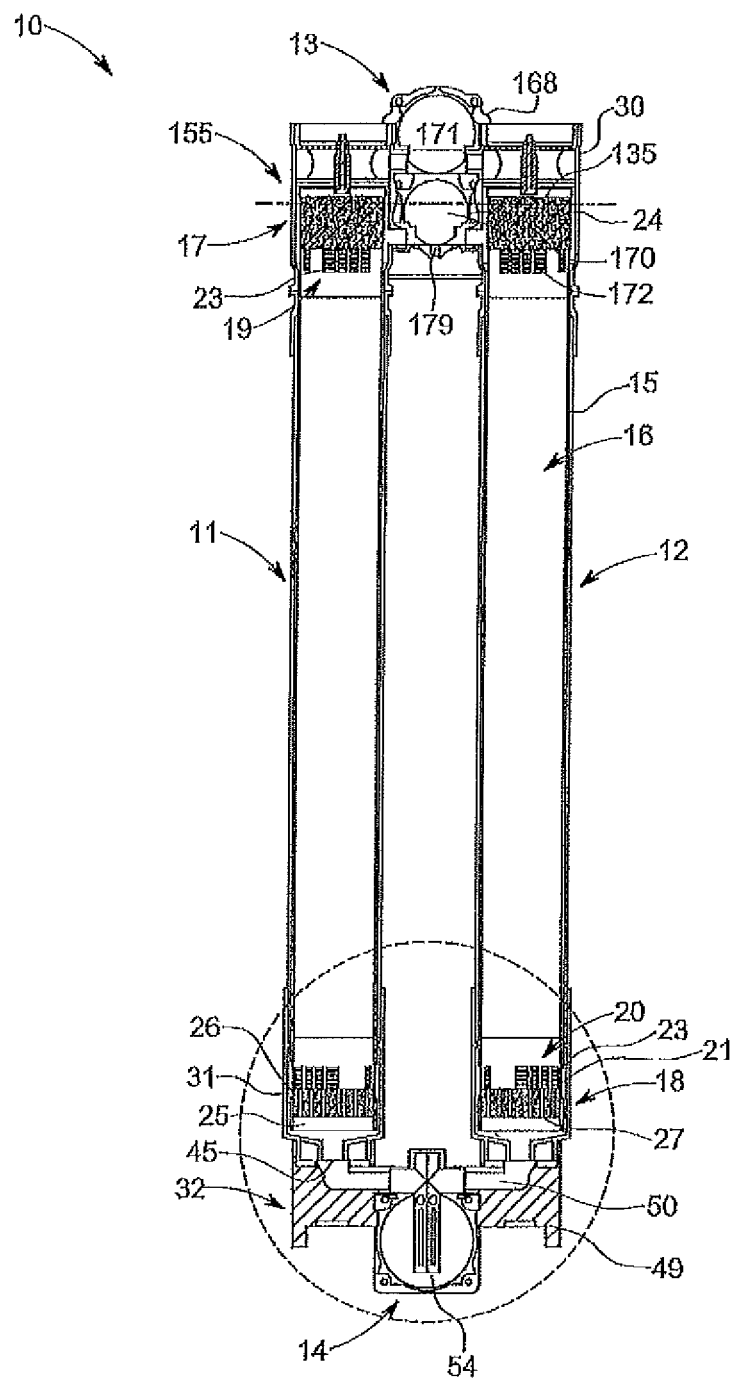
FIG. 1 is a schematic cross-sectional elevation view of a pair of membrane filtration modules.

Aspects and embodiments disclosed herein are not limited in application to the details of construction and the arrangement of components set forth in the following description or illustrated in the drawings. Aspects and embodiments disclosed herein are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Filter cartridges in filtration modules can be repaired if an individual membrane fails or becomes damaged, without necessarily having to replace the entire filter cartridge. This repair process is called "pin repair," and involves locating the damaged fiber(s) in the filter cartridge and inserting a relatively short (about 10 mm long) pin into the top of the fiber to block the fiber lumen. The damaged fiber is effectively removed from operation of the filter cartridge, enabling the remaining fibers to operate normally in the filtration module. The advantages of pin repair are reduced costs in delaying replacement of the filter cartridge and maximizing its operating life.

One difficulty with previously known pin repair techniques is that, in these techniques, the module to be repaired needs to be removed from the filtration unit and installed in a dedicated pin repair device to carry out the repair. Accordingly, a typical pin repair process involves a shutdown of the filtration unit, removing the module to be repaired, repairing the module in the dedicated pin repair device, reinstalling the module, and restarting the filtration unit. The process of removing and reinstalling the module may take a similar amount of time as the time required to perform the actual repair in the pin repair device. Where only a minor repair is required, the time involved with removing and reinstalling the module(s) that have to be repaired can be significantly longer than the actual repair process. Also, removing and reinstalling a module in a bank of modules increases the risk of operator injury or damage to the membrane module or other modules in the bank due to manual handling of the modules.

Aspects and embodiments disclosed herein advantageously provide methods and devices whereby pin repair can be performed quickly and safely with a reduced risk of damaging the filtration cartridges in unaffected modules.

Aspects and embodiments of the present invention will be described with reference to hollow fiber membranes but it is to be understood that aspects and embodiments disclosed herein are not necessarily limited thereto as they may be applied to systems incorporating other kinds of filter membranes, for example, porous or permeable membranes in a spiral wound, mat, or sheet form.

Aspects and embodiments of the present invention relate to filter module assemblies composed of filter membrane cartridge or sub-module assemblies having opposed, symmetrical potting heads attached to either end, although filter membrane cartridges or sub-modules having dissimilar potting heads are also contemplated. Aspects and embodiments disclosed herein may be implemented with single ended pressurized membrane filtration modules.

Aspects and embodiments of the present invention relate to filter module assemblies which utilize headers adapted to conduct fluids in the form of feed, filtrate, and gas to other headers, for example, adjacent like headers, and into and out of the filter cartridge or sub-module assembly to which they are connected.

Aspects and embodiments of the present invention relate to membrane filters whose filter sub-modules comprise elongate bundles of permeable hollow fiber membranes wherein feed to be filtered is applied to the outside of the bundle of fiber membranes and filtrate or permeate is withdrawn from the fiber lumens. Aspects and embodiments of the present invention relate to membrane filtration systems having multiple filtration modules connected together in a bank of filtration modules. A fluid control module, alternatively referred to herein as a manifold, fluidly communicates a source of feed and a source of aeration gas to headers of one or more of the filtration modules in the bank. The fluid control module and/or filtration module headers may include integrated feed, filtrate, and gas conduits. The fluid control module may be configured to automatically deliver gas to the filtration module headers upon introduction of gas into a feed conduit included within a body of the fluid control module.

Examples of the type of fluid control manifolds which may be used with aspects and embodiments disclosed herein are described in Applicant's Australian Patent Application No. 2010902334, the subject matter of which is incorporated herein in its entirety by cross-reference.

An embodiment of a filter module assembly 10 suitable for use with aspects and embodiments disclosed herein is shown in FIG. 1, and is described in more detail in the Applicant's International Patent Application PCT/US2012/055715, which is herein incorporated by reference in its entirety for all purposes.

FIG. 1 is a side sectional elevational view of the filter module assembly 10. The filter module assembly 10 includes two filter modules 11 and 12 mounted in common upper and lower manifolds, 13 and 14, respectively. Each filter module 11 and 12 includes a tubular outer casing 15 that encloses a respective sub-module or cartridge 16. The sub-module 16 comprises a plurality of hollow fiber membranes (not shown) potted in and extending vertically between opposed upper and lower potting heads 17 and 18. Upper and lower potting heads 17 and 18 may be formed of resinous potting material. The potting heads 17 and 18, in this embodiment, are generally cylindrical in configuration though the shape and size of the potting heads is not narrowly critical and a variety of configurations may be used including square, rectangular, triangular or elliptical blocks. Each module 11 and 12 has an upper header 155.

The hollow fiber membranes form the working part of the filter sub-module or cartridge 16. Each fiber membrane may have an average pore size of about 0.04-0.2 microns, a wall thickness of about 100-500 microns and a lumen diameter of about 300-1,000 microns. The fiber membranes may be arranged in bundles. There may be about 14,000 hollow fibers in the bundle, but this number, as well as the individual fiber dimensions and characteristics are not narrowly critical and may be varied according to operational requirements.

Each potting head 17, 18 is cast into and peripherally surrounded on its outer side by a respective potting sleeve 19, 20 which extends longitudinally in the direction of the fibers towards a respective opposed potting head 17, 18. Each potting sleeve 19, 20 extends beyond the interface between the potting head 17, 18 and the fibers extending longitudinally from the potting head 17, 18 towards a respective opposed potting head 17, 18 to form a fluid communication region 21.

Each potting sleeve 19, 20 has a plurality of openings 23 formed therein located in the fluid communication region 21. In this embodiment, an array of openings 23 is provided spaced circumferentially and longitudinally from each other. Each opening 23 is in the form of a circumferentially extending slot. It will be appreciated that the number, size and shape of the opening 23 is not narrowly critical. The openings 23 are preferably located towards the distal end 24, 25 of each potting head 17, 18.

The lower potting head 18 is provided with a number of through passages 26 extending generally longitudinally from the lower end surface 27 of the lower potting head 18 to its upper surface from which the potted membrane fibers (not shown) extend.

The lower and upper potting heads 17, 18 and the respective potting sleeves 19, 20 are fitted into respective upper header housings 30 and lower sockets 31. A lower header 32 is a combined feed/gas header which has a head piece 49 with an internal fluid connection passageway 50, designated as a feed port, extending downward from a fluid transfer port 45 and radially outward to a side of the head piece 49. A common fluid control manifold 54 is located between the lower head pieces 49 of each module 11, 12 for conveying a feed fluid to be treated by the paired modules 11, 12.

A filtrate receiving chamber 135 is positioned between an upper surface of the upper potting head 17 and an end cap 120 (FIG. 2) of each module 11, 12. Open ends of the fiber membranes potted in the upper potting head 17 open into filtrate receiving chamber 135 and provide fluid communication between the membrane fiber lumens and filtrate receiving chamber 135.

Figure 2:
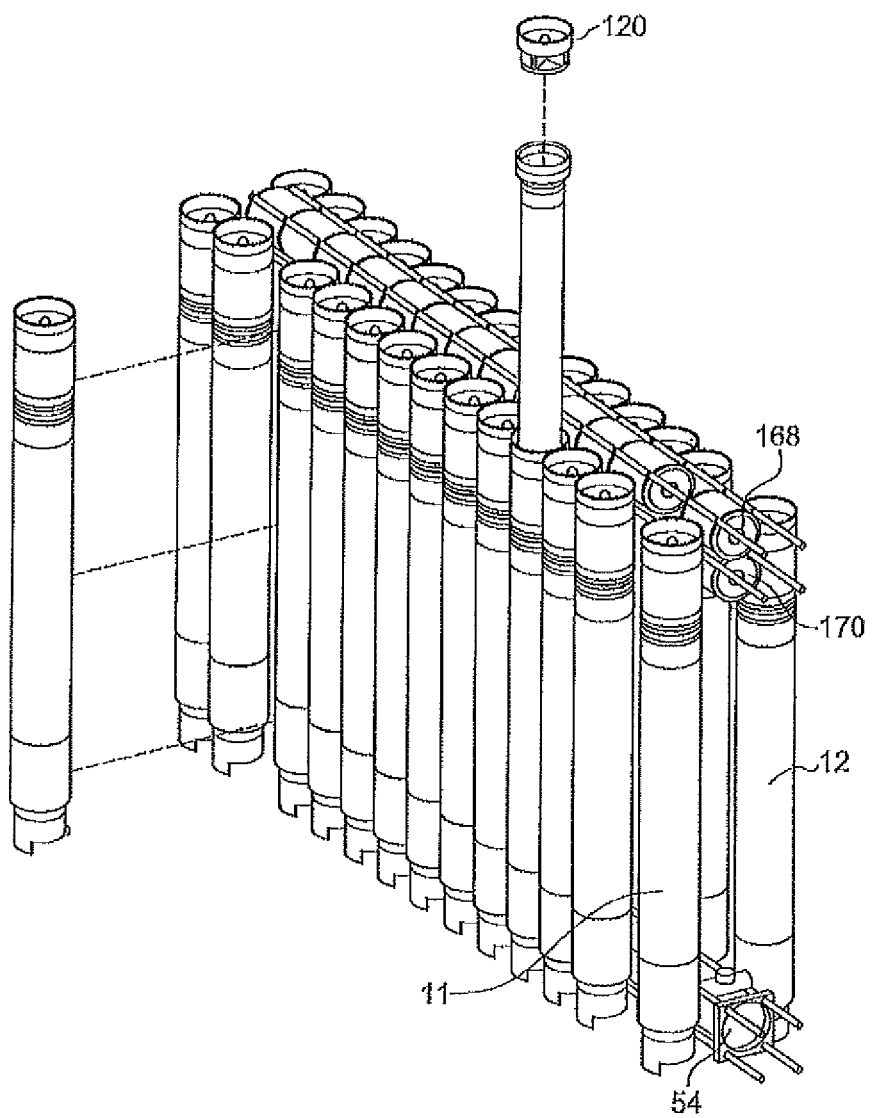
FIG. 2 is a front schematic, partially exploded, perspective view of a bank of membrane modules in a partially disassembled state.

FIG. 2 illustrates an exemplary filtration module assembly and manifold configuration as described in International Patent Application PCT/US2012/055715 that is suitable for use with various aspects and embodiments disclosed herein. A fluid transfer manifold 170 and the filtrate transfer manifold 168 are each provided with a respective generally circular cross-section passageway 172 and 171, respectively (FIG. 1) extending normal to the longitudinal axis of the modules 11, 12. The filtrate transfer manifold 168 is mounted to and above the fluid transfer manifold 170. The manifolds 168, 170 are mounted between the upper header housings 30 of each module pair 11, 12 so as not to obstruct the removal of the respective end caps 120 of each header housing 30. The lower manifold 170 may include a passageway 179 (FIG. 1) extending longitudinally along its base for receiving a tie bar which helps hold portions of the manifolds 168, 170 in adjacently positioned filtration modules together.

Figure 3:
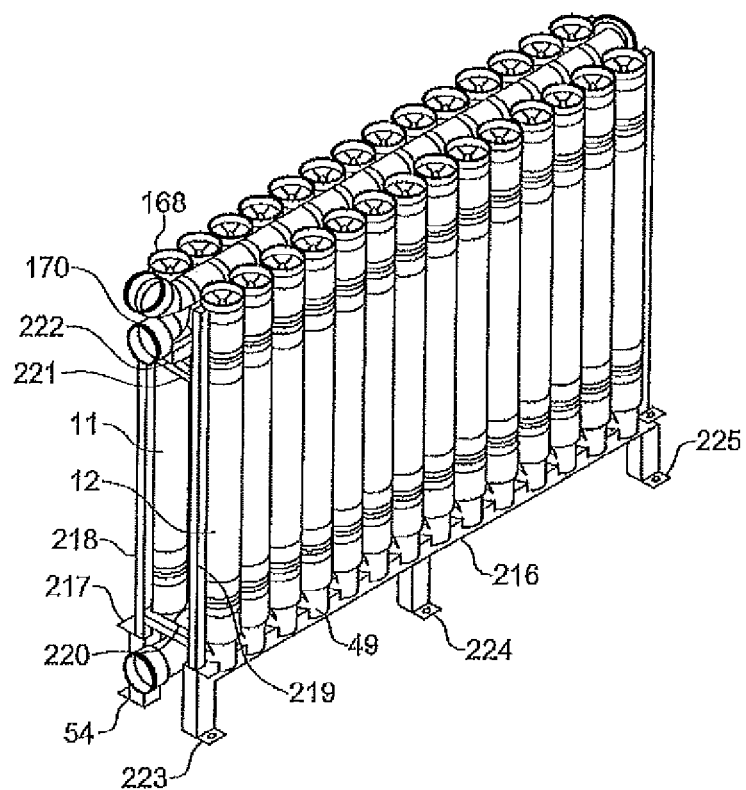
FIG. 3 is a schematic perspective view of a row of pairs of filtration modules mounted on a support rack.

FIG. 3 shows an exemplary mounting arrangement for a row of pairs of modules in a non-expensive light-weight rack, as described in International Patent Application PCT/US2012/055715 that is suitable for use with various aspects and embodiments disclosed herein. The filtration system arrangement comprises a plurality of membrane module pairs 11 and 12 having filtration membranes included therein disposed on a rack formed of a pair of parallel base support rails 216 and 217 extending longitudinally along a row of module pairs. The lower header piece 49 of each module 11 and the lower header piece 49 of each module 12 is supported on rail 216 and rail 217, respectively. End support members 218 and 219 extend vertically upward from the respective rails 216 and 217 at each end of the rack. A lower cross member 220 spaces the end support members and extends horizontally between the support members 218 and 219 adjacent to and above the lower headers 49. An upper cross member 221 further spaces the end support members 218 and 219 and extends horizontally between the support members adjacent to and below fluid transfer manifold 170. An upper longitudinal rail 222 extends along the length of and between the rows of module pairs and is supported on upper cross members 221. Each base support rail 216 and 217 includes feet 223, 224, and 225 which extend downward from the respective ends of the rails and at a mid portion of each rail. The feet support the lower head pieces 49 above the lower common manifold 54.

The manifold arrangements shown in FIGS. 2 and 3 provided a convenient means for individual removal of sub-modules 16 for replacement or repair. However, this entailed removing the sub-module 16 out of the casing 15.

As such, it would be desirable to perform repair of the module in situ without having to remove the module from the unit or rack. However, to implement in situ repair several issues need to be addressed. One issue is that in situ pin repair is that it may require the liquid waste within the module to be drained and removed. Since the individual module is typically part of a unit having a plurality of modules that are fluidly connected to each other by a manifold arrangement, draining an individual module may requires emptying the entire filtration assembly. In addition, in many installations with filtration module units it is desirable to keep the floor space clean to avoid hazards, thus requiring a container to safely store and remove the liquid waste drained from the modules.

Another issue with in situ pin repair is that pin repair can be a lengthy process. For example, it may take up to 30 minutes to repair a single module. If multiple modules need to be repaired, modules in a unit may be exposed to air for a prolonged period causing fiber drying and loss of performance. In addition, a significant amount of time may be spent in draining the shell side of the module and removing the liquid waste volume.

Also, an integrity test is generally integrated in the operating process of the unit. The integrity test is generally carried out by pressuring the lumen with compressed air at not less than 70 kPa and tests the ability of the module to hold the air pressure when the compressed air source is removed. Depending on the method used, either the outer surface of the fibers or the lumens of the fibers are exposed to air during the integrity test. Due to capillary effects, an integral fiber with its fiber wall fully filled with water should not pass any compressed air. If an integral fiber is unduly dried, however, air will leak through the fiber wall freely and reduce the ability of the lumen to hold air pressure. Thus, the air pressure drop during the integrity test caused by fiber drying can give a false integrity test results.

A further issue is that in situ pin repair can pose a safety risk, since it involves filling the shell sides of the modules in a unit with compressed air, hence significantly increasing the hazard level due to the explosive property of compressed air. The hazard level is calculated based on applied compressed air pressure and the volume. For a defined pressure, the hazard level increases linearly with volume. Thus, the housing of the module would desirably be strengthened to minimize this hazard level to acceptable limits. Depending on the volume of the shell side of the module, this would impose significant costs for a unit with more than 15 to 30 modules. The costs incurred in strengthening the housing would significantly increase manufacturing costs and hence the retail cost for the unit.

Figure 4:
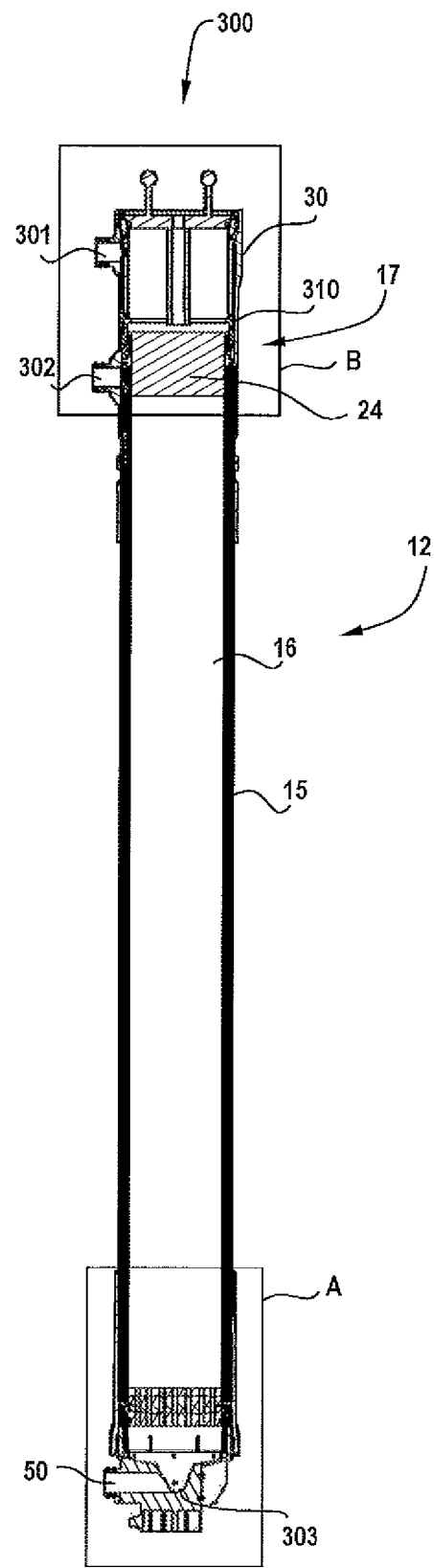
FIG. 4 is a schematic cross-sectional elevational view of one of the membrane filtration modules including an embodiment of a fluid transfer assembly.
Figure 5:
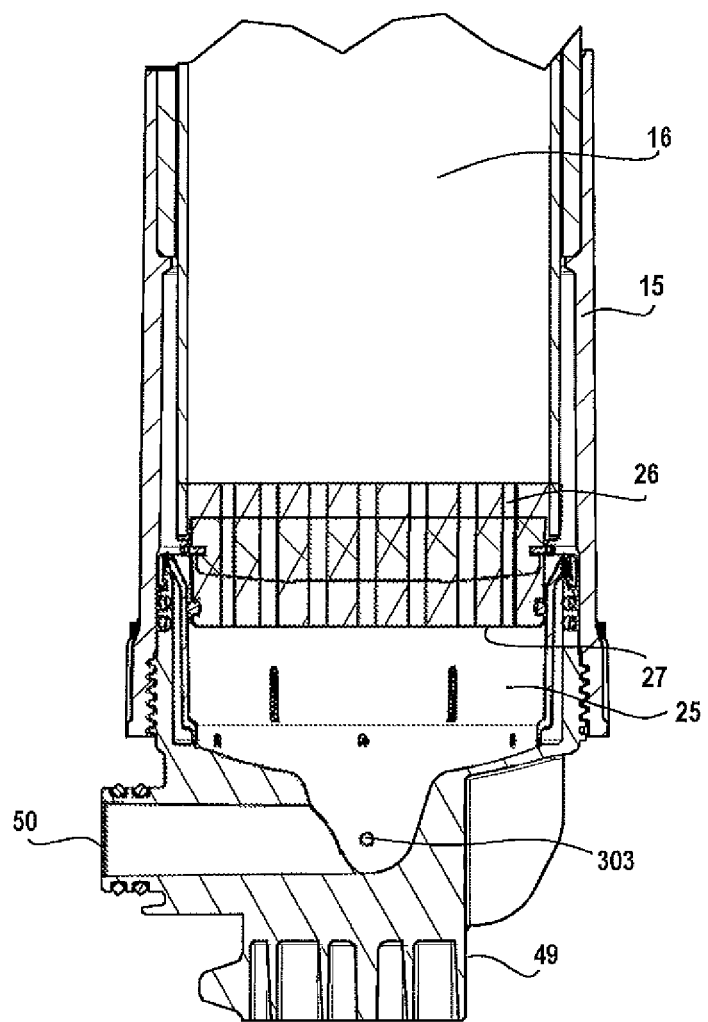
FIG. 5 is an enlarged schematic cross-sectional elevation view of region A of FIG. 4.

Referring to FIGS. 4 and 5, a fluid transfer assembly 300 and method in accordance with various aspects and embodiments disclosed herein is shown which enables repair of damaged sub-modules in situ, without having to remove the sub-module 16 out of the casing 15. FIGS. 4 and 5 also show a simplified diagram of one of the membrane filtration modules 11, 12 to more clearly illustrate the method according to this embodiment of the invention. In particular, the module 12 has four fluid communication openings or "ports" that are in fluid communication with the manifolds 54, 168, and 170 (as best shown in FIGS. 1 to 3) that fluidly connect the module 12 with the other modules 11, 12 in the unit or rack. The module 12 has a filtrate port 301 in the upper header housing 30 for conveying filtrate to the filtrate transfer manifold 168 and an exhaust port 302 for conveying liquid waste from the casing 15 into the fluid transfer manifold 170. At its opposite end, the module 12 has a feed port 50 for conveying feed fluid to be treated from the feed manifold 54 to the module and an aeration port 303 for injecting air from an aeration manifold (not shown) to facilitation filtration. The upper header housing 30 defines a filtrate collection chamber 305 that extends from the distal end 24 of the potting head 17 up to the top of the housing, which is normally fluidly sealed by the removable end cap 120, as shown in FIG. 2.

Figure 6:
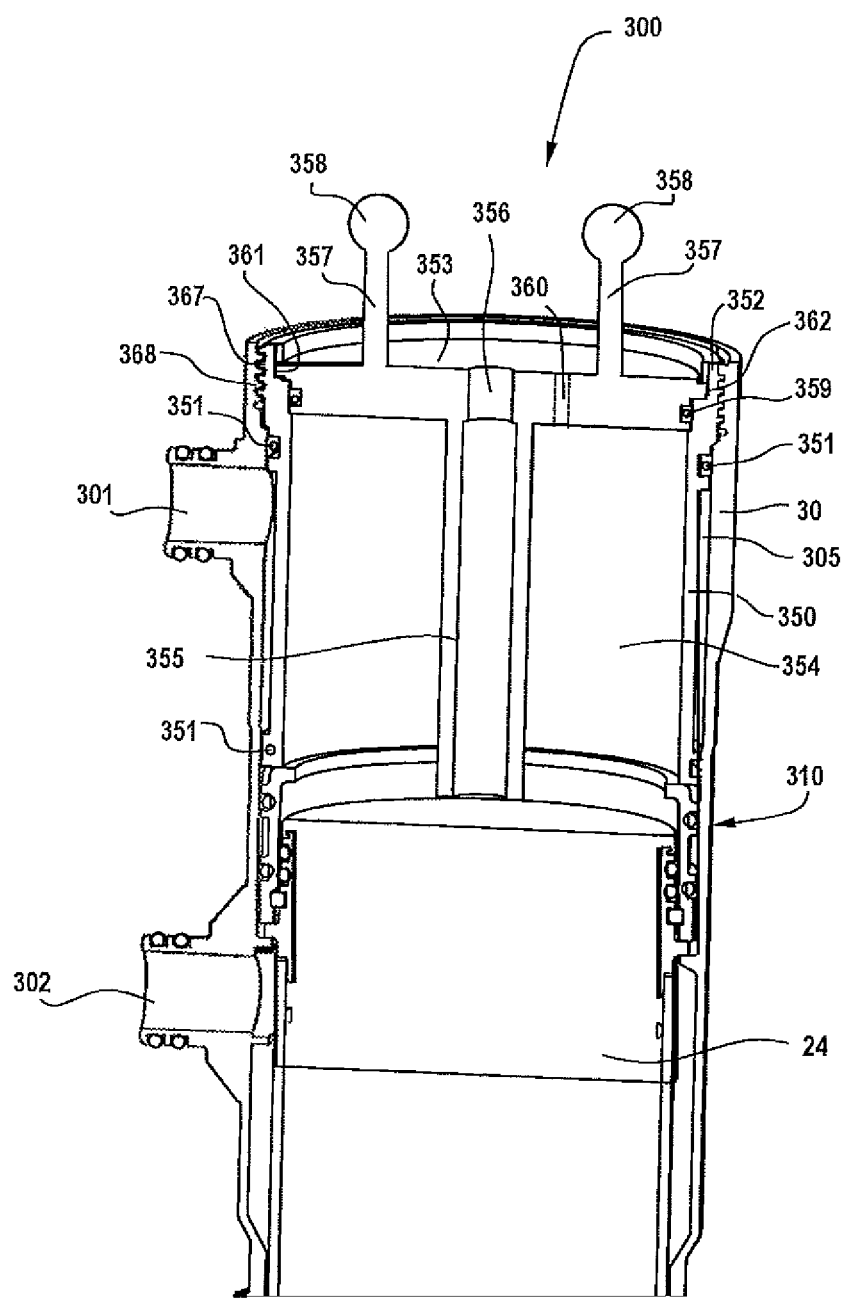
FIG. 6 is an enlarged schematic cross-sectional elevation view of region B of FIG. 4.
Figure 7:
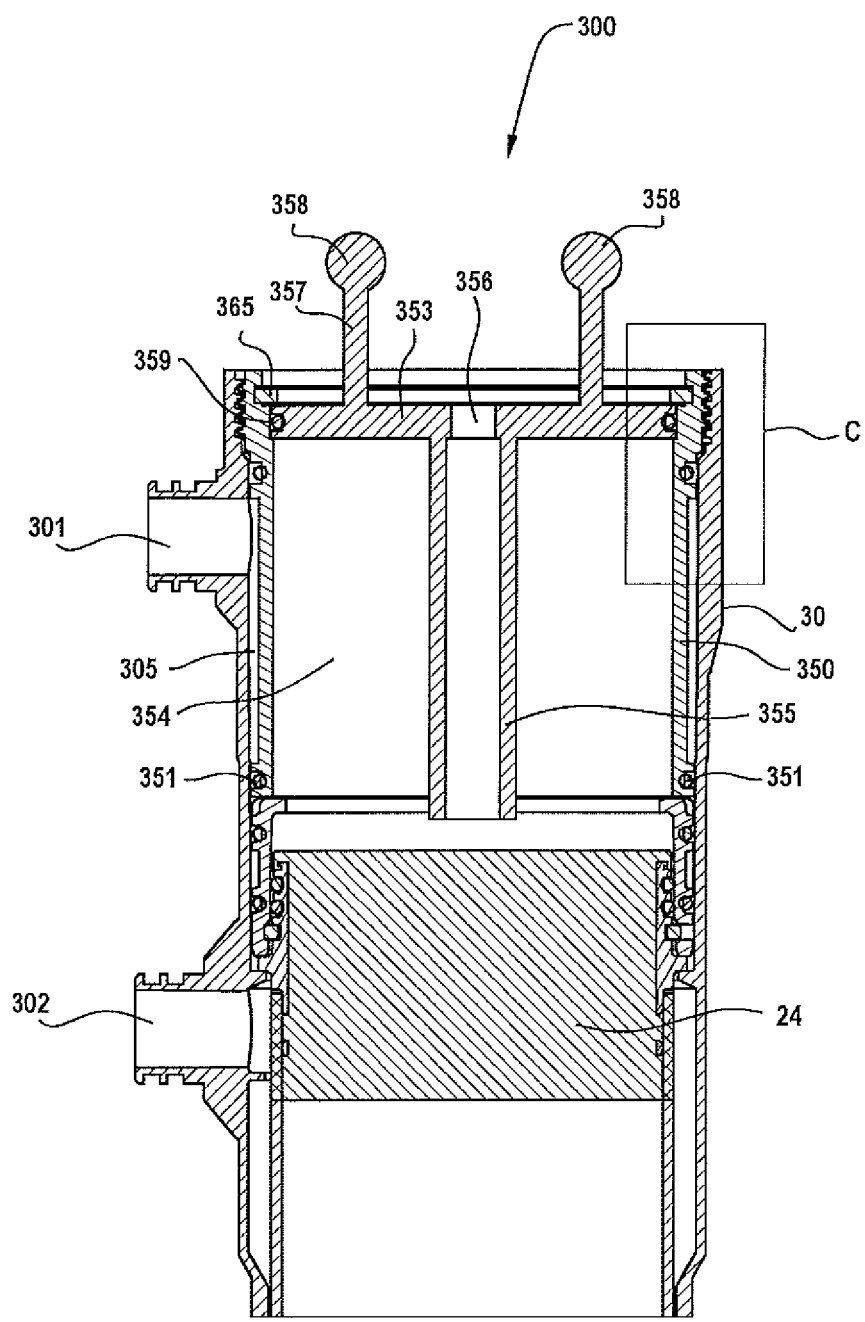
FIG. 7 is an alternate embodiment of the structure illustrated in FIG. 6.
Figure 8:
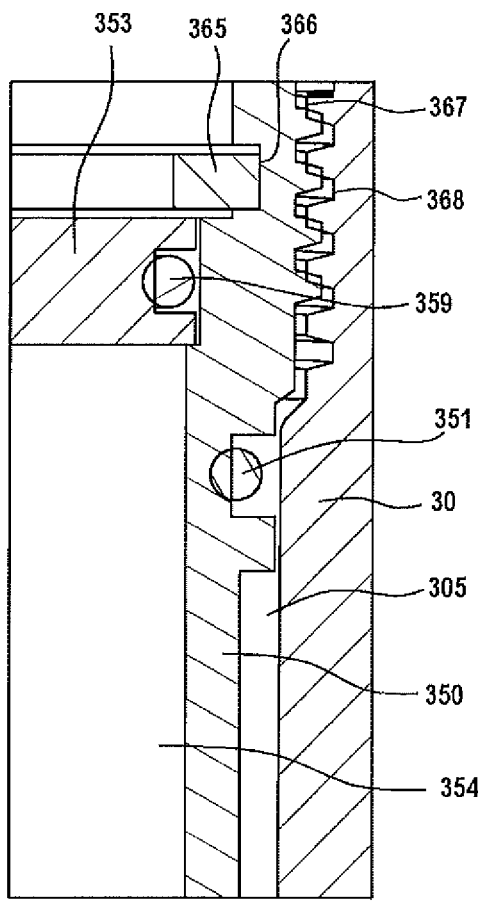
FIG. 8 is an enlarged schematic cross-sectional elevation view of region C of FIG. 7.

Referring to FIGS. 6 to 8, the fluid transfer assembly 300 has a body in the form of a tubular sleeve 350 having a fluid communication passageway in the form of a through bore 354 for transferring fluid from the module 12. The sleeve 350 at least partly fluidly isolates the filtrate port 301 from the through bore 354.

As the sleeve body 350 has a length approximate to the length of the upper header housing 30, it closes off the filtrate port 301 from the through bore 354. In addition, two sealing members in the form of O-rings 351 are provided on the outer surface of the sleeve 350 for fluidly isolating the filtrate port 301 from the through bore 354. The O-rings 351 are located on the sleeve 350 so that they are located or positioned on either side of the filtrate port 301 when the sleeve 300 is installed into the upper header housing 30, thus fluidly sealing off the filtrate port 301.

While the body 350 is a tubular sleeve in this embodiment, it will be appreciated that the body can have other polygonal cross-sections to complement the inner cross-section of the membrane filtration module and/or upper header housing 30. For example, the body can have a rectangular or square cross-section to complement a rectangular or square inner cross-section of the membrane filtration module. Likewise, the body can have other cross-sections, such as triangular, oval, elliptical, hexagonal, octagonal or any other polygonal cross-section, as desired to complement the inner cross-section of the membrane filtration module and/or upper header housing 30.

The fluid transfer assembly 300 also has one end 352 of the sleeve an optional end cap 353 for fluidly sealing the fluid transfer assembly 300 and the filtrate collection chamber 305. The end cap 353 has a sealing member 359 in the form of an O-ring to fluidly seal off the fluid transfer assembly 300.

The cap 353 also has a fluid transferring conduit in the form of a tube 355 that is in fluid communication with an exit bore 356. Thus, fluid in the filtrate collection chamber 305 is able to flow under a driving pressure into the through bore 354 and then through the tube 355 and out of the exit bore 356. The exit bore is connected to a hose or other tube to permit the fluid to drain out of the module 12, through the fluid transfer assembly 300 and the hose to a floor drain or sump. Hence, this avoids spillage of filtrate on the plant floor, eliminating a potential hazard in the plant. In some embodiments, the exit bore 356 has thread for securing the hose or tube to the fluid transfer assembly 300. An air vent 360, shown in dotted lines, can also be provided to assist in siphoning the liquid out from the through bore 354, through the tube 355 and out exit bore 356.

Where spillage of the filtrate does not present a hazard, then the cap 353 may be dispensed with and the fluid transfer assembly 300 may comprise the sleeve 350 and O-rings 351 without the cap 353.

The cap 353 may also have a pair of handles 357 and grips in the form of knobs 358 to allow easy installation and removal of the sleeve 300 into and out of the upper header housing 30.

As discussed above, the cap 353 is an optional component to the sleeve 300. As such, instead of being permanently fixed to the sleeve body 350, the cap 353 is secured to the sleeve body 350 by way of bayonet-type fitting in the form of a flange 361 in the cap that securingly engages a seat 362 formed on the inner surface of the sleeve body 350 at one end 352, as best shown in FIG. 6.

Alternatively or additionally, the cap 353 can be secured to the sleeve 350 using a securing member in the form of a circlip 365 that engages a seat 366 in the sleeve 350 adjacent to the cap. The circlip 365 hinders or prevents outward movement of the cap 353.

In some embodiments, the cap 353 and the sleeve 350 may have complementary threads for securing the cap to the sleeve. The sleeve 350 may has a thread 367 at its outer surface at one end 352 for engaging a corresponding thread 368 on the upper header housing 30 for securing the fluid transfer assembly 300 to the upper header housing of the membrane filtration module 12.

Other methods of removably securing or permanently securing the cap 353 to the sleeve 350 known in the art may additionally or alternatively be employed.

Figure 12:
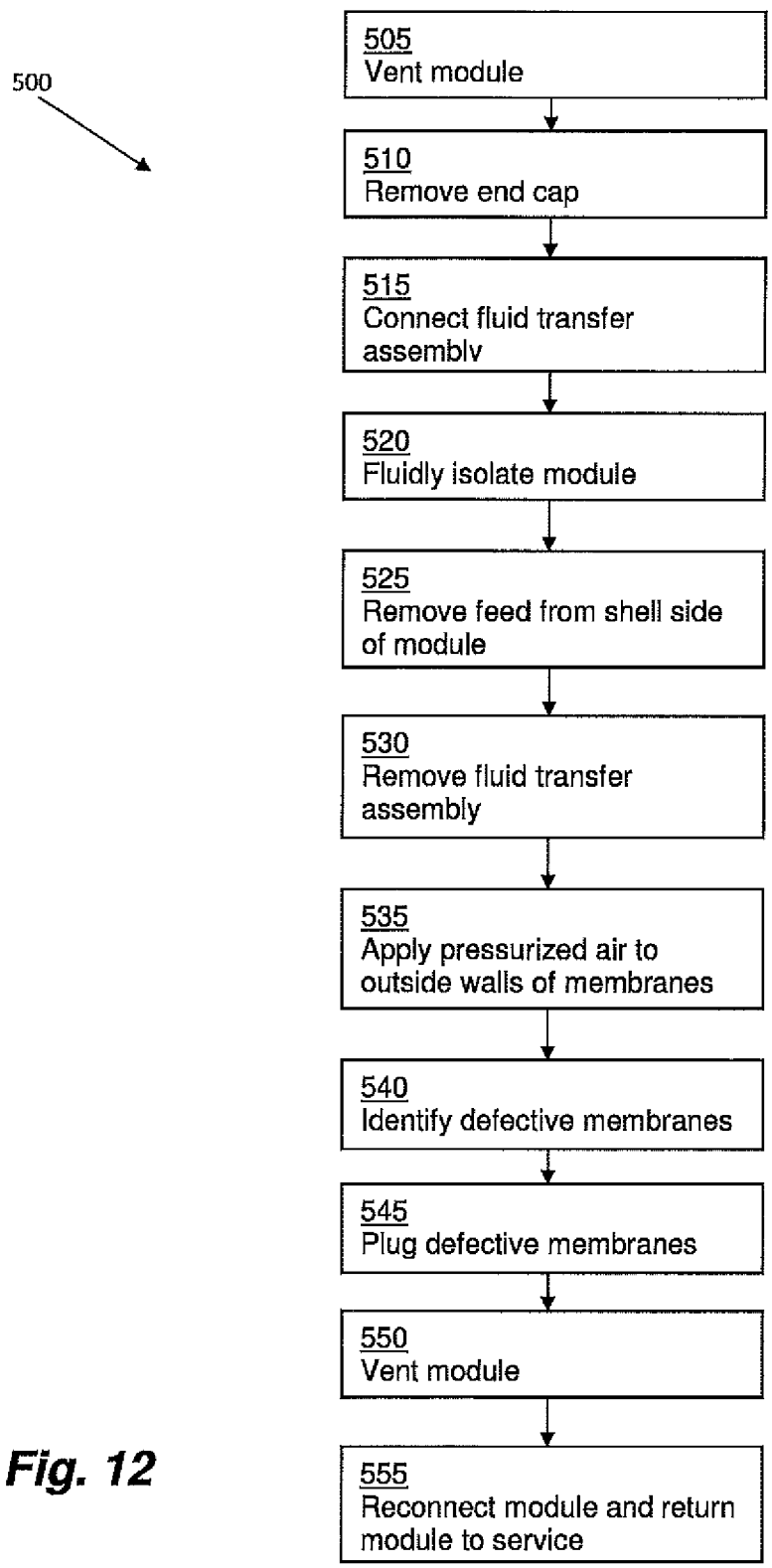
FIG. 12 is a flowchart of a method according to one embodiment.

A repair process to perform an in situ pin repair according to various aspects and embodiments disclosed herein using the fluid transfer assembly 300 will now be described. A flowchart of this method is illustrated generally at 500 in FIG. 12.

Membrane failure may be detected by a pressure decay test (PDT) that is conducted a regular intervals during operation of the rack or unit of modules. Once a module has been identified as requiring repair, all pipe connections to the unit or rack are isolated from the rest of the plant. The pressurized module 12 is vented to release pressure within the module (act 505). Both the shell side of the module 12 and the lumens of the membranes may be depressurized. The shell side and lumen pressure readings may be checked to ensure the both pressure readings are low enough to allow safe removal of the removable end cap 120 of the module 12 to be repaired. The removable end cap 120 is then removed (act 510) and the fluid transfer assembly 300 is fluidly connected to the membrane filtration module 12 (act 515). A more detailed description of the fluid transfer assembly 300 is provided below.

The membrane filtration module 12 is then fluidly isolated from the other membrane filtration modules in the rack or unit (act 520). This ensures that the remaining membrane filtration modules are not affected by the repair process, and hence reduces or minimizes any risk of damage to those modules due to being exposed to air while waiting for the module containing the defective membranes to be repaired. Fluid isolation of the module 12 can be achieved in several ways, which will be discussed in more detail below. Generally, in one embodiment, one or more of the fluid communication openings of the module 12 are fluidly sealed or closed to prevent the pressurized gas from entering the manifolds and the other membrane filtration modules. In some embodiments, isolation of the membrane filtration module may occur prior to or concurrently with any of acts 505, 510, or 515.

A pressurized gas in the form of compressed air is introduced into the membrane filtration module 12 to force liquid within the membrane filtration module into the fluid transfer assembly 300 (act 525). As the module 12 to be repaired is fluidly isolated from the common manifolds 54, 168, 170, and the filtrate port 301 is fluidly isolated from the other modules in the unit or rack, only the module to be repaired is vented to air. Hence, positive transmembrane pressure (TMP) only occurs in the module 12 and consequently feed liquid in the shell side of the module passes through the membrane walls of the sub-module 16 and exits as filtrate, where it is removed via the fluid transfer assembly 300 out of the module. The compressed air drives some or all feed fluid in the casing 15 out through the membranes in the sub-module 16 as filtrate and into the filtrate collection chamber 305. The filtrate in the filtrate collection chamber 305 passes into the fluid transfer assembly 300 and is drained out of the module 12. Filtration in the module 12 to be repaired stops when the liquid level in casing 15 reaches the lower pot 18 as all membrane fibers of the module to be repaired are exposed to the compressed air. In some embodiments, the module may be filtered down by applying suction to the membrane lumens rather than by applying compressed air to the external walls of the membranes.

In this embodiment, the compressed air is directed or injected into the module 12 at a pressure below the membrane bubble point so as to not damage the membranes during draining of the liquid via the fluid transfer assembly 300. Once the filtrate has been drained from the module, the pressurized gas is then released or vented from the membrane filtration module. These steps allow the membranes to be exposed to the atmosphere and permit testing of the membrane sub-module 16 to identify and repair the damaged membrane(s).

The damaged membrane(s) in the membrane filtration module are then identified and repaired. This involves fluidly disconnecting the fluid transfer assembly 300 from the membrane filtration module 12 by removing the fluid transfer assembly from the upper header housing 30 so that the top of the upper potting head 17 and the ends of the membrane lumens are visible (act 530). Compressed air is injected into the membrane filtration module 12 at a pressure below the membrane bubble point (act 535). The compressed air may be introduced into the shell side of the module 12 and may pass from the shell side through defects, for example, holes, tears, rips, or other defects, in damaged membranes and into the lumens of the damaged membranes.

The membranes are then examined to determine which, if any membranes are damaged (act 540). Damaged membrane(s) will show bubbles exiting their ends or lumens at the upper side of the upper potting head 17, indicating that gas has entered the membrane due to a tear or break in the membrane wall. The bubbles may be formed in residual liquid remaining on top of the upper potting head 17 by air exiting damaged membranes. The pressure of the compressed air may be increased slightly during testing to identify all the damaged membranes. A plug in the form of a relatively short plastic or metallic pin is inserted into the end of the lumen of each damaged membrane to block the lumens of the damaged membrane(s) (act 545). The pins may be sealed in the membrane lumens with an adhesive, for example, an epoxy, or may be sized and shaped such that the pins are retained in the membrane lumens by friction at operating pressures of the membrane filtration module 12. Alternatively, or additionally, the lumen of a damaged membrane may be sealed with epoxy or another form of sealant. Once all the damaged membrane(s) have been blocked and repair of the module 12 has been completed, the membranes and membrane filtration module 12 are vented to release the compressed air (act 550).

The membrane filtration module 12 is then fluidly reconnected to the plurality of membrane filtration modules (via the manifold connections) by reversing the above steps that were performed to fluidly isolate the filtrate port 301 and other fluid communication openings 50, 302, and/or 303. Thus, the filtrate port 301 would be fluidly unsealed or opened as would the other fluid communication openings.

The removable end cap 120 is then fastened to the upper header housing 30 to fluidly seal the module 12, after which the module is returned to service (act 550) and a final check is made by conducting a PDT.

The above repair process is repeated for any other modules that may require repair in the unit or rack. Where multiple operators are available for perform the repair process, then each operator can be provided with a fluid transfer assembly 300 to enable simultaneous repair of the modules. In such instances, the fluid transfer assemblies would be fluidly connected to the respective modules 12 to be repaired at the same time, so that the repair process can be performed efficiently.

Where there is only a single operator, the modules 12 are repaired one at a time to reduce or minimize air exposure of the modules to be repaired. Otherwise, it might take too long for a single operator to repair all the modules at once and thus would be more likely to result in the membrane fibers drying out during the repair process. To make this process more efficient, it is contemplated that a single operator could be provided with multiple fluid transfer assemblies 300 fitted with manually operable valves, which may be provided in the threaded bore 356 in the cap 353 where the filtrate is removed. The valve can be any type of valve, including the valve described in relation to FIGS. 9 to 11 below or isolation valve as described in International Patent Application PCT/US2012/057198.

The operator would install each fluid transfer assembly 300 to each module to be repaired after venting to release their operating pressurized air. Then, the operator would open the manually operable valve on the fluid transfer assembly 300 installed on the first module to be repaired. Due to the valve being opened on one fluid transfer assembly 300, only the module with that opened valve in its fluid transfer assembly is drained and exposed to air. After the repair is complete, the valve can be closed and the operator may open the valve of the fluid transfer assembly 300 installed on the next module to be repaired, and so on. Thus, the pressurized gas can be supplied to all the modules to be repaired at the same time without exposing the other modules to the pressurized gas. This can also be done where the pressurized gas is supplied individually to each module, rather than from a common pressurized gas supply. Without the manually operable valve on the fluid transfer assembly 300, the operator would need to release pressures of the respective modules each time, thus preventing the use of multiple fluid transfer assemblies 300 and hence requiring removal of the fluid transfer assembly 300 and reinstalling it for each module 12.

In addition, where multiple modules in the same rack or unit are to be repaired one after the other, the liquid level in the unit or rack will tend to drop after each repair of different modules within the unit or rack, which may increase the hazard factor and the risk of the membrane fibers drying out due to prolonged exposure to compressed air. Accordingly, the unit or rack may be refilled after several repairs of different modules are carried out. The frequency of refilling will depends on the number of modules in the rack or unit. The larger the number of modules in the rack or unit, the less level drop would occur and less frequent refilling would be required.

As discussed above, there are several ways to fluidly isolate the fluid communication openings that fluidly connect the module to the manifolds and hence the other modules. Common to these ways is to fluidly isolate the filtrate port 301 by fluidly sealing it off from the filtrate collection chamber 305. This is achieved using the fluid transfer assembly 300 to close the filtrate port. However, it will be appreciated that the filtrate port 301 can be fluidly sealed using other means, such as an isolation valve or a plug. However, it is more convenient for the fluid transfer assembly 300 to fluidly isolate the filtrate port 301 since it is used to drain the filtrate from the module 12 and obviates the need to provide a separate isolation means for the filtrate port. The various ways of fluidly isolating the fluid communication openings will also depend on how pressurized gas for will be delivered to the module.

The pressurized gas may be delivered through any one of the exhaust port 302, feed port 50 or aeration port 303. The pressurized gas can be transferred through these ports either by delivering pressurized gas into the common manifolds or directly through the port of the module 12 to be repaired. Where one of the common manifolds is used, the other membrane filtration modules in the unit or rack are fluidly isolated from the manifold using any isolation means, such as an isolation valve as described in International Patent Application PCT/US2012/057198.

Where the pressurized gas is injected through the exhaust port 302, the feed and aeration ports 50, 303 are fluidly isolated. In one embodiment, the feed and aeration ports 50, 303 are fluidly sealed or closed using any isolation means, such as an isolation valve as described in International Patent Application PCT/US2012/057198. In some embodiments, a flow regulator valve according to another aspect of the invention is used to close off the feed and aeration ports 50, 303 from the module and hence fluidly isolate these ports.

Where the pressurized gas is injected through the aeration port 303, the feed port 50 is fluidly isolated. In one embodiment, the feed port 50 is fluidly sealed or closed using any isolation means, such as an isolation valve as described in International Patent Application PCT/US2012/057198. In these embodiments, it is not necessary to fluidly seal the exhaust port as any liquid above the level of the exhaust fluid transfer manifold 170 (for example, the floor or invert of the manifold where the manifold is a pipe) interconnecting the exhaust ports 302 of the membrane filtration modules 12 will be displaced by the pressurized gas and forced through and out of the sub-module as filtrate, where it is passed out of the filtrate collection chamber 305 into the fluid transfer assembly 300 and the out of the module 12. Once the liquid falls below the level of the fluid transfer manifold 170, only the liquid within the module 12 to be repaired is displaced by the compressed air and transferred out as filtrate via the fluid transfer assembly 300. Thus, the exhaust port 302 is fluidly isolated from the plurality of membrane filtration modules. While it is not necessary to fluidly seal the exhaust port 302, it can be fluidly sealed if desired.

In one embodiment, the feed port 50 is fluidly sealed or closed using any isolation means, such as an isolation valve as described in International Patent Application PCT/US2012/057198. It is also not necessary to fluidly seal the exhaust port as described above, but the exhaust port may be sealed if so desired.

Alternatively, a dedicated pin repair port 310 can be provided to introduce the pressurized gas into the module 12, as best shown in FIG. 4. While the pin repair port 310 is illustrated as being located in the upper header housing 30, it can be located anywhere in the module casing 15. Where the pin repair port 310 is used, the exhaust port 302 is fluidly sealed or closed using any isolation means, such as an isolation valve as described in International Patent Application PCT/US2012/057198. However, the feed port 50 and aeration port 303 do not need to be fluidly sealed or closed, since injecting the compressed air through the pin repair port 310 in the upper header housing 30 displaces the liquid in the module to sufficiently expose the membranes without further displacing any liquid past the pot 18 where the feed and aeration ports 50, 303 are located. Thus, the feed and aeration ports 50, 303 are effectively fluidly isolated due to the manner in which the compressed air is injected into the module 12 through the pin repair port 310. While it is not necessary to fluidly seal the feed port and aeration port, they can be sealed if so desired.

The source for the pressurized gas to perform module repair can be the same as the source for the aeration port 303 or a separate unit. If the aeration air source is used, a dedicated adjustable aeration air regulator for each rack or unit is preferred to enable the modules that are not being repaired to continue to operate.

Alternatively, to enable fast removal of the liquid in the shell side of the module 12 to be repaired, minimize the impact of other modules and to adjust the pressurized gas repair pressure more accurately, the aeration air source is only used to remove the liquid in the shell side of the module being repaired and a dedicated repair air source is used for the actual membrane repair step.

Figure 9:
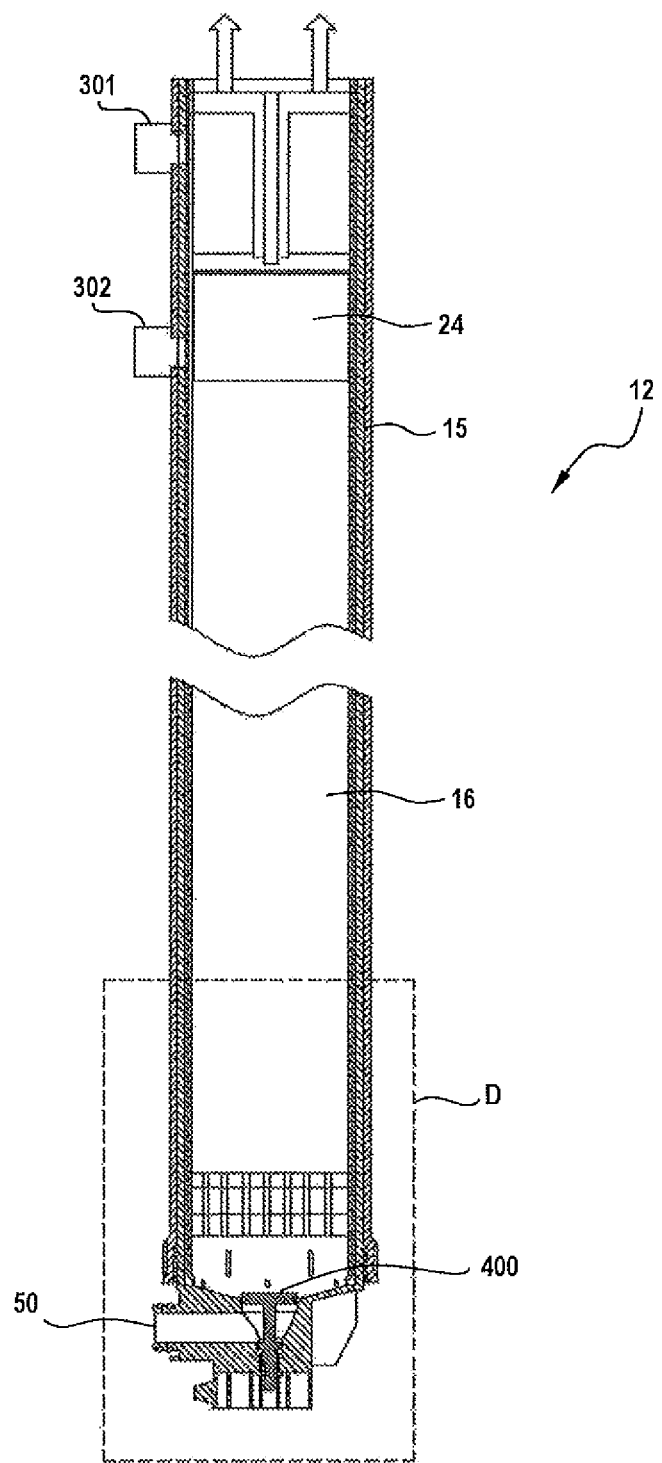
FIG. 9 is a schematic cross-sectional elevation view of a membrane filtration module including a valve according to one embodiment.
Figure 10:
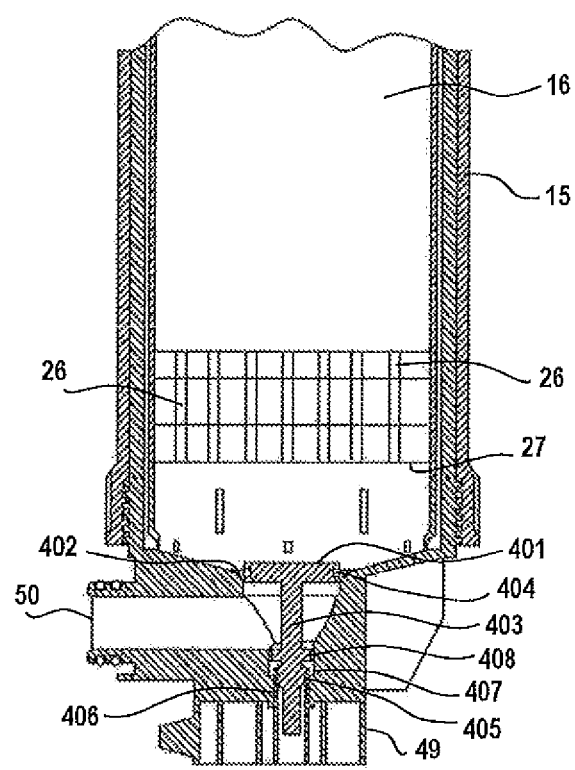
FIG. 10 is an enlarged schematic cross-sectional elevation view of region D of FIG. 9 with the valve in a partly open position.
Figure 11:
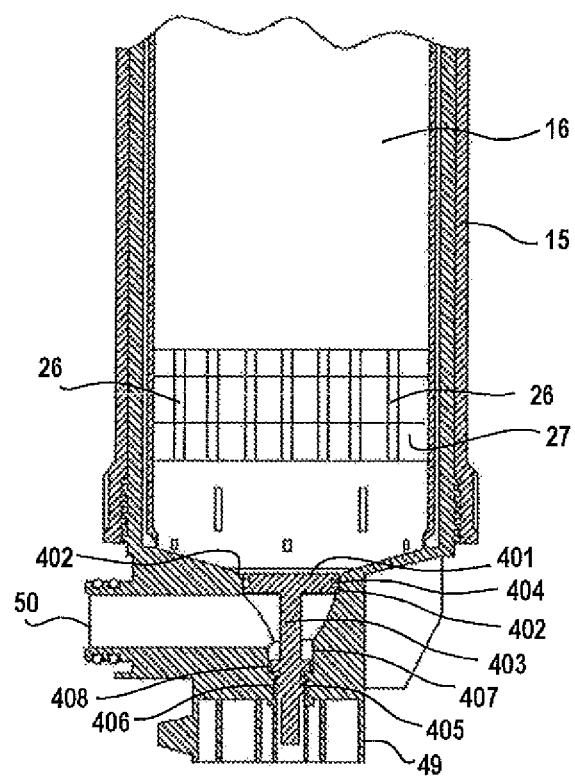
FIG. 11 is an enlarged schematic cross-sectional elevation view of region D of FIG. 9 with the valve in a closed position.

Referring to FIGS. 9 to 11, one embodiment of another aspect of the invention is shown. A valve 400 for regulating feed flow into the membrane filtration module 12 has a valve body 401 engageable with a valve seat 402 in the membrane filtration module and a stem 403 connected to the valve body for moving the valve body between a closed position and an open position to control the flow of feed fluid into the membrane filtration module. The valve 400 is positioned downstream from the feed port 50 and the aeration port 303 so that it can fluidly isolate both ports in the membrane filtration module repair method described above in relation to one embodiment of the invention. This conveniently avoids providing separate isolation valves for each of the feed and aeration ports 50, 303, and hence reduces costs, especially when measured against the number of modules in a rack or unit. The valve 400 can also be used to fluidly isolate the module from filtration if the module is identified as having an integrity issue.

The valve body 401 has a sealing member in the form of an O-ring 404 to fluidly seal the valve body against the valve seat 402 in the lower header piece 49. The valve stem 403 has a thread 405 that engages a complementary thread 406 in an inner valve bore 407. A stop 408 is also provided on the valve stem 403 to limit movement of the valve stem, and hence valve body 401 to its closed position shown in FIG. 11.

The valve 400 is operable by rotating the valve stem 403 so that the valve body 401 moves axially between the closed position and an open position. Moreover, the valve stem 403 can be rotated so that the valve body 401 can be located in discrete positions between the closed and open positions, such as the partly open position shown in FIG. 10. This permits control of the feed fluid flow into individual membrane filtration modules in a rack or unit, enabling greater control over operation of the rack or unit. In some embodiments, the stem 403 has a locking member (not shown) to secure the stem and hence the valve body 401 into the discrete position.

Even flow distribution in a unit is crucial to ensure that all the membrane modules installed in the unit perform identically. Uneven distribution of air through the aeration port 303 or the feed flow through the feed port 50 can cause solid packing in some modules and damage fibers. Solid packing, also known as solid accumulation, occurs where particles or foulants accumulate in the membrane sub-module 16 or in the casing 15 of the sub-module. Generally, good hydraulic distribution ensures solids (or foulants, particles, etc.) are distributed evenly in each module 12 during filtration and then are effectively removed by the backwash process via the exhaust port 302. If there is a preferential flow during filtration or backwash in a rack or unit (that is, uneven distribution) the particles and foulants in some of the modules 12 may not be removed during the backwash process. This results in continued accumulation of foulants in the affected modules, reducing their performance. Also, when one or more modules are packed with solids, these modules can also affect the hydraulic profile in the rack or unit.

A typical rack or unit design may include about 28 modules in each rack or unit and the internal design (for example, sizes of the openings of the fluid communication ports) may provide good distribution of liquid and gas for the 28 modules. However, where the number of modules were to be increased for operational or design requirements, for example, to about 40 modules or more per rack, the manifold pressures (being the pressure in all four feed, filtrate, aeration and exhaust manifolds) may increase to a point that instead of the fluid communication ports controlling the distribution of feed, filtrate, aeration and exhaust fluids, respectively, the pressure drops in the manifolds control the distribution of the feed, filtrate, aeration and exhaust fluids. If this occurs, uneven distribution may occur, resulting in damage to the membrane fibers.

Accordingly, by adjusting the position of the valve 400 (and hence its valve body 401) into discrete positions between its fully open and closed positions, control over the distribution of the feed and aeration fluids can be returned to the respective feed and aeration ports 50, 303. As the valve body 401 moves into discrete positions between the open and closed positions, it restricts the flow of the feed fluid and air into the fluid transfer port 45 communicating fluid between the feed and aeration ports 50, 303 and the socket 31 and potting sleeve 20 (as best shown in FIG. 1). This also adjusts the cross-sectional area of the fluid transfer port 45, and thus creates a pressure loss across valve 400, which can be made significantly larger than the manifold pressure losses. As a consequence, the pressure loss across the valve 400 reduces the effect of manifold pressure losses in controlling distribution of the feed fluid and air through the membrane filtration module 12. Thus, providing the valve 400 in each membrane filtration module 12 ensures that a more even distribution of the feed fluid and air is achieved in units or racks that have large numbers, for example, more than 28 modules.

In some embodiments, the valve stem 403 may, for example, protrude from the module 12 when activated so that it is easily ascertainable, even at a distance, that the valve is in the closed position and that the feed and aeration ports, 50, 303 which the valve controls is disconnected or offline. In accordance with some embodiments, the module 12 may have a transparent window or may be formed of transparent material so that valve 400 can be observed by an operator.

It will further be appreciated that any of the features in the disclosed aspects and embodiments may be combined together and are not necessarily applied in isolation from each other. For example, the use of the cap 353 in the fluid transfer assembly 300 can be combined with the use of the valve 400 to increase the efficiency of the membrane filtration module repair method of the invention.

Providing a method and associated fluid transfer assembly for performing repair of a membrane filtration module fluidly connected to a plurality of additional membrane filtration modules confers significant advantages over the prior art. In particular, being able to perform repair of the membrane filtration module in situ negates the need to remove the module for repairs. This significantly reduces manual handling of large and heavy modules, and hence labor involved with maintenance and repair of racks or units of these membrane filtration modules. It also reduces the machine downtime due to module repairs. Thus, in accordance with various aspects and embodiments disclosed herein an operator is able to perform individual module repairs relatively quickly, reducing the risk of damaging the membrane fibers due to air exposure. By isolating individual modules for repair, there is less waste in draining the entire rack or unit of modules to repair a single or relatively few modules at a time. Also, isolating individual modules reduces the safety risks involved by limiting the use of compressed air to a single module and not all the modules in a rack or unit, as well as reducing or minimizing the hazard created by potential spills of the exhausted liquid in the module being repaired. In all these respects, the aspects and embodiments disclosed herein represent a practical and commercially significant improvement over the prior art.

Those skilled in the art would readily appreciate that the various parameters and configurations described herein are meant to be exemplary and that actual parameters and configurations will depend upon the specific implementation in which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a heat exchanger system or water treatment system. It is, therefore, to be understood that the foregoing embodiments are presented by way of example only and that, within the scope of the appended claims and equivalents thereto, the disclosed systems and methods may be practiced otherwise than as specifically described. For example, flat sheet membranes may be prepared and used in the systems of the present disclosure. The present systems and methods are directed to each individual feature, system, or method described herein. In addition, any combination of two or more such features, systems, or methods, if such features, systems or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, the fluid transfer assembly may be prepared by any fabrication technique, including injection molding or welding techniques and be fabricated from any desired material. In other instances, an existing facility may be modified to utilize or incorporate any one or more aspects of the invention. Thus, in some instances, the systems may involve connecting or configuring an existing facility to comprise a filtration system or components of a filtration system, for example, the manifolds disclosed herein. Accordingly, the foregoing description and drawings are by way of example only. Further, the depictions in the drawings do not limit the disclosures to the particularly illustrated representations.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

The invention claimed is:

1. A method for diagnosing a membrane filtration module in fluid communication with a plurality of additional membrane filtration modules, the membrane filtration module including an upper header housing and a filtrate collection chamber defined within the upper header housing, the method comprising:
fluidly connecting a fluid transfer assembly to the membrane filtration module;
fluidly isolating the membrane filtration module from the plurality of additional membrane filtration modules;
forcing liquid within the membrane filtration module into the fluid transfer assembly by introducing a pressurized gas into the membrane filtration module;
releasing the pressurized gas from the membrane filtration module;
fluidly disconnecting the fluid transfer assembly from the membrane filtration module;
determining if one or more membranes in the membrane filtration module are damaged; and
fluidly reconnecting the membrane filtration module to the plurality of additional membrane filtration modules; wherein the fluid transfer assembly comprises:
a body having open upper and lower ends and a single fluid communication passageway defined within the body, a first sealing member circumscribing an upper periphery of the body; and
a second sealing member circumscribing a lower periphery of the body, the first and second sealing members engaging an inner surface of a wall on the upper header housing on upper and lower sides of a filtrate port defined in the wall of the upper header housing when the fluid transfer assembly is disposed within the upper header housing and fluidly isolating the filtrate port of the membrane filtration module from the single fluid communication passageway, the single fluid communication passageway being in fluid communication between the filtrate collection chamber and an exterior of the membrane filtration module when the fluid transfer assembly is disposed within the upper header housing.

2. The method of claim 1, wherein fluidly isolating the membrane filtration module from the plurality of membrane filtration modules comprises fluidly isolating the filtrate port of the membrane filtration module.

3. The method of claim 2, wherein fluidly reconnecting the membrane filtration module to the plurality of additional membrane filtration modules comprises fluidly reconnecting the filtrate port.

4. The method of claim 2, wherein fluidly isolating the membrane filtration module from the plurality of additional membrane filtration modules comprises fluidly sealing the filtrate port from the plurality of additional membrane filtration modules.

5. The method of claim 4, wherein fluidly reconnecting the membrane filtration module to the plurality of additional membrane filtration modules comprises fluidly unsealing the filtrate port.

6. The method of claim 2, wherein fluidly isolating the membrane filtration module from the plurality of additional membrane filtration modules comprises fluidly isolating the filtrate port with the fluid transfer assembly.

7. The method of claim 6, wherein the body of the fluid transfer assembly is sealingly engageable with the membrane filtration module, and fluidly isolating the membrane filtration module from the plurality of additional membrane filtration modules comprises fluidly sealing the filtrate port by at least partly inserting the body into the membrane filtration module.

8. The method of claim 1, wherein fluidly isolating the membrane filtration module from the plurality of additional membrane filtration modules comprises fluidly isolating one or more fluid communication openings between the membrane filtration module and the plurality of additional membrane filtration modules.

9. The method of claim 8, wherein fluidly reconnecting the membrane filtration module to the plurality of additional membrane filtration modules comprises fluidly reconnecting the one or more fluid communication openings between the membrane filtration module and the plurality of additional membrane filtration modules.

10. The method of claim 8, wherein fluidly isolating the membrane filtration module from the plurality of additional membrane filtration modules comprises fluidly sealing the one or more fluid communication openings from the plurality of additional membrane filtration modules.

11. The method of claim 10, wherein fluidly reconnecting the membrane filtration module to the plurality of additional membrane filtration modules comprises fluidly unsealing the one or more fluid communication openings between the membrane filtration module and the plurality of additional membrane filtration modules.

12. The method of claim 8, wherein the one or more fluid communication openings comprise a feed port configured for introducing a feed liquid into the membrane filtration module, an exhaust port configured for removing waste liquid and/or enabling backwashing, and an aeration port configured for introducing air into the membrane filtration module for filtration of the feed liquid.

13. The method of claim 1, wherein introducing the pressurized gas into the membrane filtration module comprises introducing the pressurized gas through one or more fluid communication openings between the membrane filtration module and the plurality of additional membrane filtration modules.

14. The method of claim 1, wherein introducing the pressurized gas into the membrane filtration module comprises introducing the pressurized gas through a pressurized gas port in a housing of the membrane filtration module.

15. The method of claim 14, wherein the pressurized gas port is in an upper part of the housing of the membrane filtration module.

16. The method of claim 1, wherein introducing the pressurized gas into the membrane filtration module comprises introducing the pressurized gas through an exhaust port of the membrane filtration module while a feed port of the membrane filtration module and an aeration port of the membrane filtration module are fluidly isolated.

17. The method of claim 1, wherein introducing the pressurized gas into the membrane filtration module comprises introducing the pressurized gas downstream of a feed port of the membrane filtration module while the feed port and an aeration port of the membrane filtration module are fluidly isolated.

18. The method of claim 1, wherein introducing the pressurized gas into the membrane filtration module comprises introducing the pressurized gas through an aeration port of the membrane filtration module while a feed port of the membrane filtration module is fluidly isolated.

19. The method of claim 1, wherein introducing the pressurized gas into the membrane filtration module comprises introducing the pressurized gas through a pressurized gas port of the membrane filtration module while an exhaust port of the membrane filtration module is fluidly isolated.

20. The method of claim 1, wherein the pressurized gas is introduced at a pressure below a bubble point of the membranes in the membrane filtration module.

* * * * *